(12) United States Patent
Kang

(10) Patent No.: US 12,468,212 B2
(45) Date of Patent: Nov. 11, 2025

(54) ELECTRONIC DEVICE AND CONTROL METHOD THEREOF

(71) Applicant: SAMSUNG ELECTRONICS CO., LTD., Suwon-si (KR)

(72) Inventor: Shinho Kang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 18/408,043

(22) Filed: Jan. 9, 2024

(65) Prior Publication Data

US 2024/0176218 A1 May 30, 2024

Related U.S. Application Data

(63) Continuation of application No. PCT/KR2022/009533, filed on Jul. 1, 2022.

(30) Foreign Application Priority Data

Aug. 23, 2021 (KR) .......................... 10-2021-0111171

(51) Int. Cl.
  *G06F 1/32* (2019.01)
  *G03B 21/14* (2006.01)
  *H01H 47/00* (2006.01)

(52) U.S. Cl.
  CPC ............. *G03B 21/14* (2013.01); *H01H 47/00* (2013.01)

(58) Field of Classification Search
  CPC .................................. G03B 21/14; H01H 47/00
  See application file for complete search history.

(56) References Cited

U.S. PATENT DOCUMENTS

| | | | |
|---|---|---|---|
| 4,927,990 A * | 5/1990 | Aoki | H01H 13/50 200/276.1 |
| 6,217,199 B1 | 4/2001 | Lo et al. | |

(Continued)

FOREIGN PATENT DOCUMENTS

| | | |
|---|---|---|
| JP | 2002-134208 A | 5/2002 |
| JP | 2012-160322 A | 8/2012 |

(Continued)

OTHER PUBLICATIONS

International Search Report (PCT/ISA/210) issued on Oct. 26, 2022 by the International Searching Authority in International Patent Application No. PCT/KR2022/009533.

(Continued)

*Primary Examiner* — Rexford N Barnie
*Assistant Examiner* — Esayas G Yeshaw
(74) *Attorney, Agent, or Firm* — Sughrue Mion, PLLC

(57) ABSTRACT

An electronic device including a socket; a sensor configured to detect whether an object is inserted into the socket; a switch configured to control a supply of a current to the socket; a galvanizing device configured to detect the current flowing through the socket; and a processor that controls the switch based on detection of at least one of results of the sensor and the galvanizing device, wherein the processor is configured to: based on detecting insertion of the object into the socket, control the switch during a preset galvanization time, and control the switch such that the supply of the current to the socket is maintained based on a value of the current flowing through the socket during the preset galvanization time.

15 Claims, 16 Drawing Sheets

(56) References Cited

U.S. PATENT DOCUMENTS

| | | |
|---|---|---|
| 6,491,534 B1 | 12/2002 | Bonard et al. |
| 7,347,597 B2 | 3/2008 | French |
| 9,109,780 B2 | 8/2015 | Hsiao |
| 10,122,116 B2 | 11/2018 | Troufflard et al. |
| 10,204,062 B2 | 2/2019 | Lee et al. |
| 10,564,199 B2 | 2/2020 | Kim |
| 2006/0101294 A1* | 5/2006 | Lee .................. G06F 1/266 713/300 |
| 2009/0269961 A1 | 10/2009 | Poulsen |
| 2010/0259243 A1* | 10/2010 | Li .................. H02J 3/12 323/353 |
| 2011/0095722 A1 | 4/2011 | Chang |
| 2011/0302433 A1* | 12/2011 | Liu .................. H02J 9/005 713/340 |
| 2012/0194075 A1 | 8/2012 | Iwai et al. |
| 2014/0358311 A1* | 12/2014 | Lai .................. G01R 19/0092 700/295 |
| 2015/0061542 A1 | 3/2015 | Hsia et al. |
| 2015/0348809 A1 | 12/2015 | Iu et al. |

FOREIGN PATENT DOCUMENTS

| | | |
|---|---|---|
| JP | 2014-120223 A | 6/2014 |
| JP | 2018-163784 A | 10/2018 |
| KR | 10-1667707 B1 | 10/2016 |
| KR | 10-2018-0014522 A | 2/2018 |
| KR | 10-2018-0050287 A | 5/2018 |
| KR | 10-2019-0028953 A | 3/2019 |
| WO | 2016/002107 A1 | 1/2016 |

OTHER PUBLICATIONS

Written Opinion (PCT/ISA/237) issued on Oct. 26, 2022 by the International Searching Authority in International Patent Application No. PCT/KR2022/009533.

* cited by examiner

ELECTRONIC DEVICE AND CONTROL METHOD THEREOF

CROSS-REFERENCE TO RELATED APPLICATION

This application is a bypass continuation of International Application No. PCT/KR2022/009533, filed on Jul. 1, 2022, in the Korean Intellectual Property Receiving Office, which claims priority to Korean Patent Application No. 10-2021-0111171, filed on Aug. 23, 2021, in the Korean Intellectual Property Office, the disclosures of which are incorporated by reference herein in their entireties.

BACKGROUND

1. Field

The disclosure relates to an electronic device and a control method thereof, and more particularly, to an electronic device that detects whether an object is inserted into a socket to which a light source is coupled, and controls supply of power to the socket, and a control method thereof.

2. Description of Related Art

As technologies have developed, electronic devices equipped with various optical output functions are being developed, and for example, there may be a lighting device, a display device, a portable communication device, or a projector. Such an electronic device may include a socket structure to which a light source is coupled, and recently, there is an increasing number of electronic devices that have excellent power efficiency, and are equipped with not only a lighting function but also multimedia output or smart functions by using eco-friendly LED lamps.

In a conventional socket to which a lamp was coupled, a part of an electrode of the socket was exposed to the outside when the lamp was separated, and thus there was a risk of an electric shock, and accordingly, attention in handling was needed for an electronic device to which a lamp was coupled. Also, due to such a problem in safety, a conventional electronic device including a socket to which a lamp was coupled had to acquire a specification as a lighting device by the Underwriter's Laboratories (US) or the National Electrical Code (NEC) authentication standard, even though it was equipped with multimedia output or smart functions. Therefore, an electronic device equipped with functions of detecting appropriate coupling of a lamp and controlling supply of power has advantages that it can reduce a risk of an electric shock compared to a lighting device, and can acquire the specification of a multimedia device. Accordingly, there has been a technical demand for an electronic device that stably blocks power of a socket while a lamp is separated from the socket, and is equipped with a function of detecting appropriate detachment of the lamp.

SUMMARY

Provided is an electronic device which includes a sensor that detects whether an object is inserted into a socket, and a galvanizing device that detects the strength of a current flowing through the socket, and which detects a coupling state of the socket and controls supply of power, and a control method thereof.

Additional aspects will be set forth in part in the description which follows and, in part, will be apparent from the description, or may be learned by practice of the presented embodiments.

In accordance with an aspect of the disclosure, an electronic device including a socket: a sensor configured to detect whether an object is inserted into the socket: a switch configured to control a supply of a current to the socket; a galvanizing device configured to detect the current flowing through the socket; and a processor that controls the switch based on detection of at least one of results of the sensor and the galvanizing device, wherein the processor is configured to: based on detecting insertion of the object into the socket, control the switch during a preset galvanization time, and control the switch such that the supply of the current to the socket is maintained based on a value of the current flowing through the socket during the preset galvanization time.

The electronic device may further include wherein the processor is configured to: control the switch such that the supply of the current to the socket is maintained based on the value of the current measured after a first standby time during the preset galvanization time.

The electronic device may further include, wherein the processor is configured to: repeat a cycle wherein the switch is turned on during a preset first time and the switch is turned off during a preset second time during the preset galvanization time a plurality of times.

The electronic device may further include, wherein the processor is configured to: maintain a turned-on state of the switch based on the value of the current measured after an initial cycle of a preset number of times among a plurality of cycles.

The electronic device may further include, wherein the processor is configured to: based on the value of the current being a value between a first current value which is a preset positive value and a second current value which is a preset negative value, control the switch such that the supply of the current to the socket is maintained.

The electronic device may further include, wherein the processor is configured to: based on the value of the current being greater than or equal to the first current value or smaller than or equal to the second current value, control the switch such that the supply of the current to the socket is blocked.

The electronic device may further include, wherein the sensor may include: a light emitting part that irradiates a light inside the socket; a light receiving part that is spaced from the light emitting part and recognizes the light; and a transmitting part that detects a recognition state of the light by the light receiving part and transmits the recognition state to the processor.

The electronic device may further include, wherein the sensor may include: a button that protrudes inside the socket, and configured to be pushed and moved when the object is inserted: a spring that provides an elastic force while supporting the button; and an electrode that contacts and is separated from the button based on a movement of the button, and configured to supply or block the current to or from the socket.

The electronic device may further include, wherein the galvanizing device includes: a galvanizing resistance that is arranged in a route wherein the current flowing through the socket moves: an amplifier that amplifies a voltage: and a comparator that receives the voltage and compares the voltage with a preset voltage value, and provides the voltage to the processor.

A control method of an electronic device, the method including: detecting whether an object is inserted into a socket: controlling a switch that controls supply of a current to the socket during a preset galvanization time; identifying a value of the current flowing through the socket during the preset galvanization time: and maintaining the supply of the current to the socket by controlling the switch based on the value of the current.

The control method of an electronic device may further include, wherein the identifying the value of the current flowing through the socket during the preset galvanization time may include: waiting during a first standby time during the preset galvanization time: and identifying the value of the current measured after the waiting during the first standby time.

The control method of an electronic device may further include, wherein the controlling the switch during the preset galvanization time may include: repeating a cycle wherein the switch is turned on during a preset first time and the switch is turned off during a preset second time a plurality of times.

The control method of an electronic device may further include, wherein the identifying the value of the current flowing through the socket during the preset galvanization time may include: identifying the value of the current measured after an initial cycle of a preset number of times among a plurality of cycles.

The control method of an electronic device may further include, wherein the identifying the value of the current flowing through the socket during the preset galvanization time may include: based on the value of the current being a value between a first current value which is a preset positive value and a second current value which is a preset negative value, proceeding to the maintaining of the supply of the current to the socket. The control method of an electronic device of claim 14, wherein the identifying the value of the current flowing through the socket during the preset galvanization time may include: based on the value of the current being greater than or equal to the first current value or smaller than or equal to the second current value, controlling the switch to block the supply of the current to the socket.

BRIEF DESCRIPTION OF THE DRAWINGS

The above and other aspects and features of certain embodiments of the present disclosure will be more apparent from the following description taken in conjunction with the accompanying drawings, in which.

DETAILED DESCRIPTION

Figure 1:
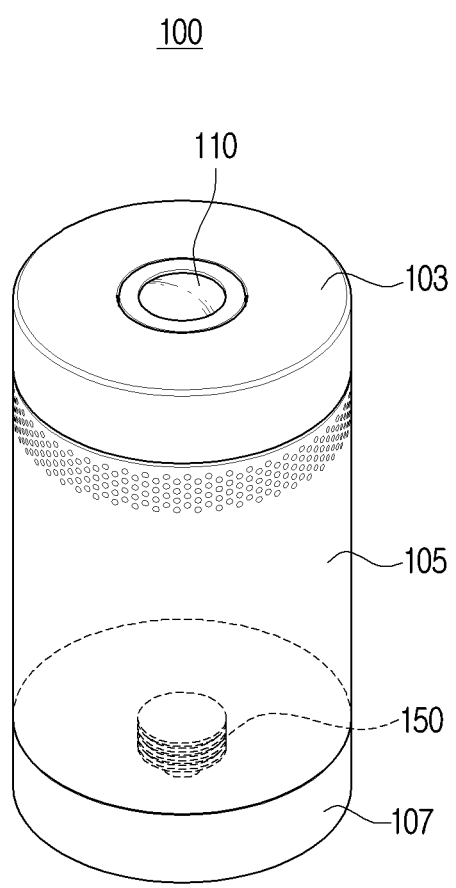
FIG. 1 is a perspective view illustrating an exterior of an electronic device according to an embodiment of the disclosure.

First, terms used in this specification will be described briefly, and then the disclosure will be described in detail. According to embodiments, in describing the disclosure, detailed explanation regarding related known technologies may be omitted, and overlapping explanation of the same components will be omitted as much as possible.

Also, as terms used in the embodiments of the disclosure, general terms that are currently used widely were selected as far as possible, in consideration of the functions described in the disclosure. However, the terms may vary depending on the intention of those skilled in the art who work in the pertinent field or previous court decisions, or emergence of new technologies. Further there may be terms that were designated by the applicant on his own, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

In addition, various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents, or alternatives of the embodiments included in the ideas and the technical scopes disclosed herein. According to embodiments, in case it is determined that in describing embodiments, detailed explanation of related known technologies may unnecessarily confuse the gist of the disclosure, the detailed explanation will be omitted.

Further, the various embodiments of the disclosure and the terms used in the embodiments are not for limiting the technology described in the disclosure to a specific embodiment, but they should be interpreted to include various modifications, equivalents, or alternatives of the embodiments. According to embodiments, with respect to the detailed description of the drawings, similar or related components may be designated by similar reference numerals. Also, a singular form of a noun corresponding to an item may include one of the item or a plurality of the items, unless instructed obviously differently in the related context. In addition, in the disclosure, each of the expressions "A or B," "at least one of A and B." "at least one of A or B," "A, B, or C." "at least one of A. B, and C," and "at least one of A. B, or C" and the like may include any one of the items listed together with the expression among the expressions, or all possible combinations of the listed items. Also, terms such as "first," "second." and the like may be used just to distinguish one element from another element, and are not intended to limit the elements from another aspect (e.g.: the importance or the order). Further, in case it is mentioned that one element (e.g.: a first element) is "coupled" or "connected" to another element (e.g.: a second element) together with the term "functionally" or "communicatively" or without such a term, it is that the one element may be connected to the another element directly (e.g.: via wire), wirelessly, or through a third element.

Also, terms such as "first" and "second" may be used to describe various elements, but they are not intended to limit the elements. Such expressions may be used only to distinguish one element from another element. For example, a first element may be called a second element, and a second element may be called a first element in a similar manner, without departing from the scope of the disclosure.

In addition, singular expressions include plural expressions, unless defined obviously differently in the context. Also, in the disclosure, terms such as "include" or "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Further, in the disclosure, "a module" or "a part" performs at least one function or operation, and may be implemented as hardware or software, or as a combination of hardware and software. In addition, a plurality of "modules" or "parts" may be integrated into at least one module and implemented as at least one processor, except "a module" or "a part" that needs to be implemented as specific hardware.

Also, the term "a module" used in various embodiments of the disclosure may include a unit consisting of hardware, software, or firmware, and it may be interchangeably used with terms such as a logic, a logical block, a component, or a circuit. Further, a module may be a component consisting of an integrated body or a minimum unit of the component performing one or more functions or a portion thereof. For example, according to an embodiment, a module may be implemented in a form of an application-specific integrated circuit (ASIC).

Hereinafter, the embodiments of the disclosure will be described in detail with reference to the accompanying drawings, such that those having ordinary skill in the art to which the disclosure belongs can easily carry out the disclosure. However, it should be noted that the disclosure may be implemented in various different forms, and is not limited to the embodiments described herein. Also, in the drawings, parts that are not related to explanation were omitted, for explaining the disclosure clearly, and throughout the specification, similar components were designated by similar reference numerals.

Further, while the embodiments of the disclosure will be described in detail with reference to the following accompanying drawings and the content described in the accompanying drawings, it is not intended that the disclosure is restricted or limited by the embodiments.

As is traditional in the field, the embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the present scope. Further, the blocks, units and/or modules of the embodiments may be physically combined into more complex blocks, units and/or modules without departing from the present scope.

Hereinafter, an electronic device according to the disclosure will be described in detail with reference to FIG. 1 to FIG. 8.

FIG. 1 is a perspective view illustrating an exterior of an electronic device 100 according to an embodiment of the disclosure. Referring to FIG. 1, the electronic device 100 may include a head 103, a main body 105, a projection lens 110, a socket 150, or a cover 107.

The electronic device 100 may be devices in various forms. The electronic device 100 may be a projector device that enlarges and projects an image to a wall or a screen, and the projector device may be a liquid crystal display (LCD) projector or a digital light processing (DLP) type projector that uses a digital micromirror device (DMD).

In addition, the electronic device 100 may be a home or industrial display device, a lighting device used in daily life, or an audio device including an audio module. Also, the electronic device 100 may be implemented as a portable communication device (e.g., a smartphone), a computer device, a portable multimedia device, a wearable device, or a home appliance, or the like. According to embodiments, the electronic device 100 according to an embodiment of the disclosure is not limited to the aforementioned devices, and may be implemented as an electronic device 100 having two or more functions of the aforementioned devices. For example, the electronic device 100 may be utilized as a display device, a lighting device, or an audio device as its projector function is turned off and its lighting function or speaker function is turned on according to a manipulation of the processor, or may be used as an artificial intelligence (AI) speaker as it includes a microphone or a communication device.

The main body 105 is a housing constituting the exterior, and may support or protect components of the electronic device 100 (e.g., components illustrated in FIG. 2) that are arranged inside the main body 105. The shape of the main body 105 may be close to a cylindrical shape as illustrated in FIG. 1. However, the shape of the main body 105 is not limited thereto, and according to various embodiments of the disclosure, the main body 105 may be implemented in various geometrical shapes such as a column having polygonal cross sections, a cone, or a sphere.

The main body 105 may have a size enabling a user to grip or move it with one hand, and may be implemented in a micro size enabling a user to carry it easily, and may be implemented in a size that can be held on a table or coupled to a lighting device.

The material of the main body 105 may be implemented as a matt metal or a synthetic resin such that a user's fingerprint or dust may not be smeared. In some embodiments, the exterior of the main body 105 may consist of a sleek glossy material.

The main body 105 may have a friction area formed in a partial area of the exterior of the main body 105 for a user to grip and move the main body 105. In some embodiments, the main body 105 may have a bent gripping part or a support 108a (refer to FIG. 3A) provided in at least a partial area for a user to grip the main body 105.

The projection lens 110 may be formed on one surface of the main body 105 to project a light that passed through a lens array to the outside the main body 105. The projection lens 110 according to the various embodiments of the disclosure may be an optical lens that was low-dispersion coated for reducing chromatic aberration. The projection lens 110 may be a convex lens or a condensing lens, and the projection lens 110 according to an embodiment of the disclosure may adjust a focus by adjusting positions of a plurality of sub lenses.

The head 103 may be provided to be coupled to one surface of the main body 105 to thus support and protect the projection lens 110. The head 103 may be coupled to the main body 105 to be able to be swiveled within a predetermined angle range based on one surface of the main body 105.

The head 103 may be automatically or manually swiveled by a user or the processor to thus freely adjust a projection angle of the projection lens 110. In some embodiments, although not illustrated in the drawing, the head 103 may include a neck that is coupled to the main body 105 and extends from the main body 105, and the head 103 may thus adjust the projection angle of the projection lens 110 by being tilted backward or forward.

The electronic device 100 may project a light or an image to a selected position by adjusting a projection angle of the projection lens 110 while adjusting the direction of the head 103 in a state wherein the position and the angle of the main body 105 are fixed. In addition, the head 103 may include a handle that a user may grip after rotating the head in a selected direction.

A plurality of openings may be formed on an outer circumferential surface of the main body 105. Through the plurality of openings, audio output from an audio outputter may be output to the outside of the main body 105 of the electronic device 100. The audio outputter may include a speaker, and the speaker may be used for uses such as reproduction of multimedia or reproduction of recording, output of a voice, etc.

According to an embodiment of the disclosure, the main body 105 may include a radiation fan provided therein, and when the radiation fan is operated, air or heat in the main body 105 may be discharged through the plurality of openings. Accordingly, the electronic device 100 may discharge heat occurring due to the driving of the electronic device 100 to the outside, and prevent overheating of the electronic device 100.

The socket 150 may connect the electronic device 100 with an external device to transmit or receive electric signals, or receive power from the outside. The socket 150 according to an embodiment of the disclosure may be physically connected with an external device. Here, the socket 150 may include an input/output interface to connect communication with an external device via wire or wirelessly, or receive power from the external device. For example, the socket 150 may include an HDMI connection terminal, a USB connection terminal, an SD card accommodating groove, an audio connection terminal, or a power consent. In some embodiments, the socket 150 may include Bluetooth, Wi-Fi, or a wireless charge connection module that is connected with an external device wirelessly.

In addition, the socket 150 may have a socket structure connected to an external lighting device, and may be connected to a socket accommodating groove of the external lighting device to receive power. The size and the specification of the socket 150 having the socket structure may be implemented in various ways in consideration of an accommodating structure of an external device that may be coupled thereto. For example, a diameter of a joining portion of the socket 150 may be implemented as 26 mm according to the international standard E26, and in this case, the electronic device 100 may be coupled to an external lighting device such as a stand in place of a light bulb that is generally used. According to embodiments, when being fastened to a conventional socket positioned on a ceiling, the electronic device 100 has a structure of being projected from the upside to the downside, and accordingly, in case the electronic device 100 is not rotated by socket coupling, the screen cannot be rotated either. Accordingly, in order that the electronic device 100 can rotate even in case the electronic device 100 is socket-coupled and receives power, the head 103 may be swiveled on one surface of the main body 105 to adjust a projection angle while the electronic device 100 is socket-coupled to a stand on the ceiling, and thus the screen can be projected or can be rotated to a selected position.

The socket 150 may include a coupling sensor, and the coupling sensor may detect whether the socket 150 is coupled to an external device, its coupling state, or its coupling target, and transmit the same to the processor, and the processor may control the driving of the electronic device 100 based on the transmitted detection value. A specific operation of the processor of controlling the driving of the electronic device 100 based on a detection result of the coupling sensor will be described in detail later with reference to FIG. 4A to FIG. 8.

The cover 107 may be coupled to or separated from the main body 105, and protect the socket 150 such that the socket 150 is not exposed to the outside at all times. The cover 107 may have a shape continued from the main body 105 as illustrated in FIG. 1, or may be implemented to correspond to the shape of the socket 150. The cover 107 may support the electronic device 100, and the electronic device 100 may be used by being coupled to or held on an external holder while being coupled to the cover 107.

In the electronic device 100 according to the various embodiments of the disclosure, a battery may be provided inside the cover 107. The battery may include, for example, a primary cell that cannot be recharged, a secondary cell that can be recharged, or a fuel cell.

Although not illustrated in the drawings, the electronic device 100 may include a camera module, and the camera module may photograph a still image or a video. According to an embodiment of the disclosure, the camera module may include at least one lens, an image sensor, an image signal processor, or a flash.

Also, although not illustrated in the drawings, the electronic device 100 may include a protection case such that the electronic device 100 can be easily carried while being protected. In some embodiments, the electronic device 100 may include a stand that supports or fixes the main body 105, or a bracket that may be coupled to a wall surface or a partition.

In addition, the electronic device 100 may be connected with various external devices by using its socket structure, and provide various functions. For example, the electronic device 100 may be connected to an external camera device by using the socket structure. The electronic device 100 may provide an image stored in the connected camera device or an image that is currently being photographed by using a projection part 210. According to another embodiment, the electronic device 100 may be connected to a battery module by using the socket structure to receive power. According to embodiments, the electronic device 100 may be connected to an external device by using the socket structure, but this embodiment is an example, and the electronic device 100 may be connected to an external device by using another interface (e.g., a USB, etc.).

Figure 2:
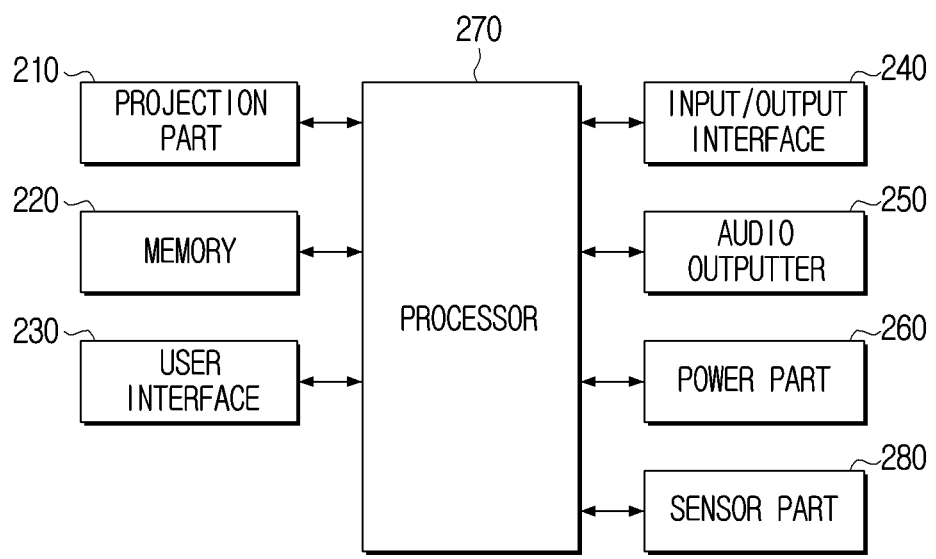
FIG. 2 is a block diagram illustrating a configuration of an electronic device according to an embodiment of the disclosure.

FIG. 2 is a block diagram illustrating a configuration of an electronic device according to an embodiment of the disclosure. As illustrated in FIG. 2, the electronic device 100 may include a projection part 210, a memory 220, a user interface 230, an input/output interface 240, an audio outputter 250, a power part 260, a processor 270, and a sensor part 280. According to embodiments, the components illustrated in FIG. 2 are an example, and some components may be omitted, or new components may be added.

The projection part 210 is a component that projects an image to the outside. According to an embodiment of the disclosure, the projection part 210 may be implemented in various projection types (e.g., a cathode-ray tube (CRT) type, a liquid crystal display (LCD) type, a digital light processing (DLP) type, a laser type, etc.). As an example, the CRT type has basically the same principle as the principle of a CRT monitor. The CRT type may display an image on a screen by enlarging the image with a lens in front of a cathode-ray tube (CRT). The CRT type may be divided into a one-tube type and a three-tube type based on the number of cathode-ray tubes, and in the case of the three-tube type, cathode-ray tubes of red, green, and blue may be implemented to be separated from one another.

As another example, the LCD type is a type of displaying an image by allowing a light emitted from a light source to pass through a liquid crystal. The LCD type is divided into a single-panel type and a three-panel type. In the case of the three-panel type, a light emitted from a light source may be separated into red, green, and blue in a dichroic mirror (a mirror that reflects only a light of a specific color and allows the rest to pass therethrough), may then pass through a liquid crystal, and may then be collected into one place again.

As still another example, the DLP type is a type of displaying an image by using a digital micromirror device (DMD) chip. A projection part in the DLP type may include a light source, a color wheel, a DMD chip, a projection lens, etc. A light emitted from a light source may be colored as it passes through a rotating color wheel. The light that passed through the color wheel is input into a DMD chip. The DMD chip includes numerous micromirrors, and reflects the light input into the DMD chip. The projection lens may perform a role of enlarging the light reflected from the DMD chip in an image size.

As still another example, the laser type includes a diode pumped solid state (DPSS) laser and a galvanometer. As a laser that outputs various colors, a laser in which three DPSS lasers are respectively installed for red, green, and blue (RGB) colors, and their optical axes overlap with one another by using a mirror is used. The galvanometer includes a mirror and a high-power motor, and moves the mirror at a high speed. For example, the galvanometer may rotate the mirror at up to 40 KHz/sec. The galvanometer may be mounted according to a scanning direction, and a projector performs planar scanning, and the galvanometer may thus also be arranged by being divided into x and y axes.

The projection part 210 may output images in a screen ratio of 4:3, a screen ratio of 5:4, and a wide screen ratio of 16:9, according to the purpose of the electronic device 100 or a user's setting or the like, and may output images in various resolutions such as WVGA (854*480), SVGA (800*600), XGA (1024*768), WXGA (1280*720), WXGA (1280*800), SXGA (1280*1024), UXGA (1600*1200), and Full HD (1920*1080), etc. according to screen ratios.

According to embodiments, the projection part 210 may perform various functions for adjusting an output image by control by the processor 270. For example, the projection part 210 may perform functions such as zoom, keystone, quick corner (four corner) keystone, lens shift, etc.

According to embodiments, the projection part 210 may enlarge or reduce an image according to a distance (i.e., a projection distance) to the screen. That is, the zoom function may be performed according to a distance to the screen. Here, the zoom function may include a hardware method of adjusting a screen size by moving a lens, and a software method of adjusting a screen size by cropping an image, or the like. According to embodiments, when the zoom function is performed, it is necessary to adjust a focus of an image. For example, a method of adjusting a focus includes a manual focusing method, an electric focusing method, etc. The manual focusing method is a method of manually adjusting a focus, and the electric focusing method is a method in which the projector automatically adjusts a focus by using a motor built therein when the zoom function is performed. When performing the zoom function, the projection part 210 may provide a digital zoom function through software, and may provide an optical zoom function in which the zoom function is performed by moving the lens through a driving part.

In addition, the projection part 210 may perform the keystone function. When a height does not match a front surface projection, the screen may be distorted up or down. The keystone function is a function of correcting a distorted screen. For example, in case a distortion occurs in a horizontal direction of the screen, the distortion may be corrected by using a horizontal keystone, and in case a distortion occurs in a vertical direction of the screen, the distortion may be corrected by using a vertical keystone. The quick corner (four corner) keystone function is a function of correcting the screen in case the balance between the corner areas of the screen is not appropriate while the central area of the screen is normal. The lens shift function is a function of moving the screen as it is in case the screen goes beyond the screen area.

According to embodiments, the projection part 210 may provide the zoom/keystone/focusing functions by automatically analyzing the surrounding environment and a projection environment without a user input. According to embodiments, the projection part 210 may automatically provide the zoom/keystone/focusing functions, based on the distance between the electronic device 100 and the screen, information about the space in which the electronic device 100 is currently positioned, information about an amount of the ambient light, or the like, which were detected through sensors (a depth camera, a distance sensor, an infrared sensor, or an illumination sensor, etc.).

In addition, the projection part 210 may provide a lighting function by using a light source. The projection part 210 may provide a lighting function by outputting a light source by using LEDs. According to an embodiment, the projection part 210 may include one LED, and according to another embodiment, the electronic device may include a plurality of LEDs. According to embodiments, the projection part 210 may output a light source by using a surface-emitting LED depending on implementation examples. Here, the surface-emitting LED may mean an LED having a structure in which an optical sheet is arranged on the upper side of the LED such that a light source is evenly dispersed and output. According to embodiments, when a light source is output through the LED, the light source may be evenly dispersed through the optical sheet, and the light source dispersed through the optical sheet may be introduced into a display panel.

According to embodiments, the projection part 210 may provide a dimming function to a user for adjusting the intensity of a light source. According to embodiments, if a user input for adjusting the intensity of a light source is received from a user through the user interface 230 (e.g., a touch display button or a dial), the projection part 210 may control the LED to output the intensity of the light source that corresponds to the received user input.

In addition, the projection part 210 may provide the dimming function based on a content analyzed by the processor 270, without a user input. According to embodiments, the projection part 210 may control the LED to output the intensity of a light source based on information on the currently provided content (e.g., the type of the content, the brightness of the content, etc.).

According to embodiments, the projection part 210 may control a color temperature by control by the processor 270. Here, the processor 270 may control the color temperature based on a content. According to embodiments, in case it is identified that a content is to be output, the processor 270 may obtain color information for each frame of the content whose output is determined. Then, the processor 270 may control the color temperature based on the obtained color information for each frame. Here, the processor 270 may obtain at least one main color of the frame based on the color information for each frame. Then, the processor 270 may adjust the color temperature based on the obtained at least one main color. For example, the color temperature that the processor 270 may adjust may be divided into a warm type or a cold type. Here, it is assumed that the frame to be output (referred to as an output frame hereinafter) includes a scene wherein a fire broke out. The processor 270 may identify (or obtain) that the main color is red based on the color information included in the current output frame. Then, the processor 270 may identify the color temperature corresponding to the identified main color (red). Here, the color temperature corresponding to the red color may be the warm type. According to embodiments, the processor 270 may use an artificial intelligence model to obtain the color information or main color of the frame. According to an embodiment, the artificial intelligence model may be stored in the electronic device 100 (e.g., the memory 220). According to another embodiment, the artificial intelligence model may be stored in an external server which can communicate with the electronic device 100.

According to embodiments, the electronic device 100 may be interlocked with an external device to control the lighting function. According to embodiments, the electronic device 100 may receive lighting information from the external device. Here, the lighting information may include at least one of brightness information or color temperature information set in the external device. Here, the external device may mean a device connected to the same network as the electronic device 100 (e.g., an IoT device included in the same home/corporate network) or a device not connected to the same network as the electronic device 100 but capable of communicating with the electronic device (e.g., a remote control server). For example, it is assumed that an external lighting device (an IoT device) included in the same network as the electronic device 100 is outputting a red light having brightness of 50. The external lighting device (e.g., an IoT device) may directly or indirectly transmit lighting information (e.g., information indicating that a red light is being output with the brightness of 50) to the electronic device 100. Here, the electronic device 100 may control the output of the light source based on the lighting information received from the external lighting device. For example, in case the lighting information received from the external lighting device includes information indicating that the red light is output with the brightness of 50, the electronic device 100 may output the red light with the brightness of 50.

According to embodiments, the electronic device 100 may control the lighting function based on biometric information. According to embodiments, the processor 270 may obtain a user's biometric information. Here, the biometric information may include at least one of the body temperature, the heart rate, the blood pressure, the breathing, or the electrocardiogram of the user. Here, the biometric information may include various kinds of information other than the aforementioned information. As an example, the electronic device may include a sensor for measuring biometric information. The processor 270 may obtain a user's biometric information through the sensor, and control the output of the light source based on the obtained biometric information. As another example, the processor 270 may receive biometric information from an external device through the input/output interface 240. Here, the external device may mean a user's portable communication device (e.g., a smartphone or a wearable device). The processor 270 may obtain the user's biometric information from the external device, and control the output of the light source based on the obtained biometric information. According to embodiments, depending on implementation examples, the electronic device may identify whether a user is sleeping, and if it is identified that the user is sleeping (or preparing to sleep), the processor 270 may control the output of the light source based on the user's biometric information.

The memory 220 may store at least one instruction regarding the electronic device 100. In addition, the memory 220 may store an operating system (O/S) for driving the electronic device 100. Also, the memory 220 may store various kinds of software programs or applications for the electronic device 100 to operate according to various embodiments of the disclosure. Further, the memory 220 may include a semiconductor memory such as a flash memory, or a magnetic storing medium such as a hard disk.

According to embodiments, the memory 220 may store various kinds of software modules for the electronic device 100 to operate according to various embodiments of the disclosure, and the processor 270 may control the operation of the electronic device 100 by executing the various kinds of software modules stored in the memory 220. That is, the memory 220 may be accessed by the processor 270, and reading/recording/correction/deletion/update, etc. of data by the processor 270 may be performed.

According to embodiments, in the disclosure, the term "memory" may include the memory 220, a ROM or a RAM in the processor 270, or a memory card (e.g., a micro SD card, a memory stick) mounted on the electronic device 100.

The user interface 230 may include various types of input devices. For example, the user interface 230 may include physical buttons. Here, the physical buttons may include function keys, direction keys (e.g., four-direction keys), or dial buttons. According to an embodiment, the physical buttons may be implemented as a plurality of keys. According to another embodiment, the physical buttons may be implemented as one key. Here, in case the physical buttons are implemented as one key, the electronic device 100 may receive a user input in which the one key is pressed during a threshold time or longer. When a user input in which the one key is pressed during a threshold time or longer is received, the processor 270 may perform a function corresponding to the user input. For example, the processor 270 may provide the lighting function based on the user input.

In addition, the user interface 230 may receive a user input by using a non-contact method. In the case of receiving a user input by using a contact method, a physical force may be transmitted to the electronic device. Accordingly, a method for controlling the electronic device regardless of a physical force may be used. According to embodiments, the user interface 230 may receive a user gesture, and perform an operation corresponding to the received user gesture. Here, the user interface 230 may receive the user gesture through the sensor (e.g., an image sensor or an infrared sensor).

Also, the user interface 230 may receive a user input by using a touch method. For example, the user interface 230 may receive a user input through a touch sensor. According to an embodiment, the touch method may be implemented as the non-contact method. For example, the touch sensor may determine whether a user body approached within a threshold distance. Here, the touch sensor may identify a user input even in case the user does not touch the touch sensor. According to embodiments, according to another implementation example, the touch sensor may identify a user input in which the user contacts the touch sensor.

According to embodiments, the electronic device 100 may receive a user input by various methods other than the user interface described above. According to an embodiment, the electronic device 100 may receive a user input through an external remote control device. Here, the external remote control device may be a remote control device corresponding to the electronic device 100 (e.g., a control device dedicated to the electronic device) or a portable communication device (e.g., a smartphone or a wearable device) of a user. Here, the portable communication device of the user may store an application for controlling the electronic device. The portable communication device may obtain a user input through the application stored therein, and transmit the obtained user input to the electronic device 100. The electronic device 100 may receive the user input from the portable communication device, and perform an operation corresponding to the user's control command.

According to embodiments, the electronic device 100 may receive a user input by using voice recognition. According to an embodiment, the electronic device 100 may receive a user voice through the microphone included in the electronic device. According to another embodiment, the electronic device 100 may receive a user voice from the microphone or an external device. According to embodiments, the external device may obtain a user voice through the microphone of the external device, and transmit the obtained user voice to the electronic device 100. The user voice transmitted from the external device may be audio data or digital data converted from the audio data (e.g., audio data converted to a frequency domain, etc.). Here, the electronic device 100 may perform an operation corresponding to the received user voice. According to embodiments, the electronic device 100 may receive the audio data corresponding to the user voice through the microphone. Then, the electronic device 100 may convert the received audio data to the digital data. Then, the electronic device 100 may convert the converted digital data to text data by using a speech to text (STT) function. According to an embodiment, the speech to text (STT) function may be directly performed in the electronic device 100.

According to another embodiment, the speech to text (STT) function may be performed in an external server. The electronic device 100 may transmit digital data to an external server. The external server may convert the digital data to text data, and obtain control command data based on the converted text data. The external server may transmit the control command data (here, the text data may also be included) to the electronic device 100. The electronic device 100 may perform an operation corresponding to the user voice based on the obtained control command data.

According to embodiments, the electronic device 100 may provide a voice recognition function by using one assistance (or an artificial intelligence agent such as Bixby™, etc.). However, this embodiment is an example, and the electronic device 100 may provide the voice recognition function by using a plurality of assistances. Here, the electronic device 100 may provide the voice recognition function by selecting one of the plurality of assistances based on a trigger word corresponding to the assistance or a specific key included in a remote control.

According to embodiments, the electronic device 100 may receive a user input by using a screen interaction. The screen interaction may mean a function in which the electronic device identifies whether a predetermined event is generated through an image projected to the screen (or the projection surface), and obtains a user input based on the predetermined event. Here, the predetermined event may mean an event in which a predetermined object is identified in a specific position (e.g., a position to which a UI for receiving a user input is projected). Here, the predetermined object may include at least one of a user's body part (e.g., a finger), a pointer, or a laser point. If the predetermined object is identified in the position corresponding to the projected UI, the electronic device 100 may identify that a user input for selecting the projected UI was received. For example, the electronic device 100 may project a guide image such that the UI is displayed on the screen. Then, the electronic device 100 may identify whether the user selects the projected UI. According to embodiments, if the predetermined event is identified in the position of the projected UI, the electronic device 100 may identify that the user selected the projected UI. Here, the projected UI may include at least one item. Here, the electronic device 100 may perform spatial analysis to identify whether the predetermined event is in the position of the projected UI. Here, the electronic device 100 may perform the spatial analysis through the sensor (e.g., an image sensor, an infrared sensor, a depth camera, a distance sensor, etc.). The electronic device 100 may identify whether the predetermined event is generated in the specific position (the position to which the UI was projected) by performing the spatial analysis. Then, in case it is identified that the predetermined event is generated in the specific position (the position to which the UI was projected), the electronic device 100 may identify that a user input for selecting the UI corresponding to the specific position was received.

The input/output interface 240 is a component for inputting or outputting at least one of an audio signal or an image signal. The input/output interface 240 may receive input of at least one of an audio signal or an image signal from an external device, and output a control command to the external device.

According to embodiments, the input/output interface 240 according to an embodiment of the disclosure may be implemented as at least one wired input/output interface among a high definition multimedia interface (HDMI), a mobile high-definition link (MHL), a universal serial bus (USB), a USB C-type, a display port (DP), a thunderbolt, a video graphics array (VGA) port, an RGB port, a D-subminiature (D-SUB), and a digital visual interface (DVI). According to an embodiment, the wired input/output interface may be implemented as an interface inputting or outputting only audio signals and an interface inputting or outputting only image signals, or implemented as one interface inputting or outputting both audio signals and image signals.

In addition, the electronic device 100 may receive data through the wired input/output interface, but this embodiment is an example, and the electronic device 100 may receive power through the wired input/output interface. For example, the electronic device 100 may receive power from an external battery through a USB C-type, or receive power from an outlet through a power adapter. As another example, the electronic device may receive power from an external device (e.g., a laptop computer or a monitor, etc.) through a display port (DP).

According to embodiments, the input/output interface 240 according to an embodiment of the disclosure may be implemented as a wireless input/output interface that performs communication by using at least one communication method among communication methods of Wi-Fi, Wi-Fi Direct, Bluetooth, Zigbee, 3rd Generation (3G), 3rd Generation Partnership Project (3GPP), and Long Term Evolution (LTE). Depending on implementation examples, the wireless input/output interface may be implemented as an interface inputting or outputting only audio signals and an interface inputting or outputting only image signals, or implemented as one interface inputting or outputting both audio signals and image signals.

Also, the disclosure may be implemented such that an audio signal is input through the wired input/output interface, and an image signal is input through the wireless input/output interface. In some embodiments, the disclosure may be implemented such that an audio signal is input through the wireless input/output interface, and an image signal is input through the wired input/output interface.

The audio outputter 250 is a component that outputs an audio signal. The audio outputter 250 may include an audio output mixer, an audio signal processor, and an audio output module. The audio output mixer may synthesize a plurality of audio signals to be output as at least one audio signal. For example, the audio output mixer may synthesize an analog audio signal and another analog audio signal (e.g.: an analog audio signal received from the outside) as at least one analog audio signal. The audio output module may include a speaker or an output terminal. According to an embodiment, the audio output module may include a plurality of speakers, and in this case, the audio output module may be arranged in the main body, and audio emitted while covering at least a portion of a diaphragm of the audio output module may pass through a waveguide to be transmitted to the outside the main body. The audio output module may include a plurality of audio output units, and the plurality of audio output units may be symmetrically arranged on the exterior of the main body, and accordingly, audio may be emitted to all directions, i.e., all directions in 360 degrees.

The power part 260 may receive power from the outside and supply power to the various components of the electronic device 100. The power part 260 according to an embodiment of the disclosure may receive power through various methods. According to an embodiment, the power part 260 may receive power by using the socket 150 as illustrated in FIG. 1. Not only that the power part 260 may receive power through an external power connected to the socket 150.

In addition, the power part 260 may receive power by using a DC power cord of 220V. However, the disclosure is not limited thereto, and the electronic device may receive power by using a USB power cord, or receive power by using a wireless charging method.

Also, the power part 260 may receive power by using an internal battery or an external battery. The power part 260 according to an embodiment of the disclosure may receive power through the internal battery. For example, the power part 260 may charge power of the internal battery by using at least one of the DC power cord of 220V, the USB power cord, or a USB C-type power cord, and may receive power through the charged internal battery. In addition, the power part 260 according to an embodiment of the disclosure may receive power through the external battery. For example, if connection between the electronic device and the external battery is performed through various wired communication methods such as the USB power cord, the USB C-type power cord, a socket groove, etc., the power part 260 may receive power through the external battery. That is, the power part 260 may directly receive power from the external battery, or charge the internal battery through the external battery and receive power from the charged internal battery.

Also, the power part 260 according to the disclosure may receive power by using at least one of the aforementioned plurality of power supply methods.

According to embodiments, with respect to power consumption, the electronic device 100 may have power consumption of a predetermined value (e.g., 43 W) or less for reasons of a socket type, other standards, etc. Here, the electronic device 100 may vary the power consumption so that the power consumption can be reduced when using the battery. That is, the electronic device 100 may vary the power consumption based on the power supply method, the power usage amount, or the like.

The sensor part 280 may include various kinds of sensors that detect the state of the electronic device 100 or the surrounding environment. For example, the sensor part 280 may include at least one of a tilt sensor that senses the tilt of the electronic device 100 or an image sensor that photographs an image. Here, the tilt sensor may be an acceleration sensor or a gyro sensor, and the image sensor may mean a camera or a depth camera.

The sensor part 280 may include various sensors other than the tilt sensor or the image sensor. For example, the sensor part 280 may include an illumination sensor and a distance sensor. Also, the sensor part 280 may include a LiDAR sensor. The sensor part 280 according to an embodiment of the disclosure may include a first sensor 160, a second sensor 170, and a third sensor 180 that detect whether the socket 150 is coupled or the coupling state, and this embodiment will be described in detail from FIG. 5A.

According to embodiments, the electronic device 100 according to an embodiment of the disclosure may provide various smart functions.

According to embodiments, the electronic device 100 may be connected to a portable terminal device for controlling the electronic device 100, and the screen output from the electronic device 100 may be controlled by a user input which is input from the portable terminal device. For example, the portable terminal device may be implemented as a smartphone including a touch display, and the electronic device 100 may receive screen data provided by the portable terminal device from the portable terminal device and output the data, and the screen output from the electronic device 100 may be controlled according to a user input that is input from the portable terminal device.

The electronic device 100 may perform connection with the portable terminal device through various communication methods such as Miracast, Airplay, wireless DEX, a remote PC method, etc., and may share contents or music provided by the portable terminal device.

In addition, connection between the portable terminal device and the electronic device 100 may be performed by various connection methods. According to an embodiment, the portable terminal device may search for the electronic device 100 and perform wireless connection therebetween, or the electronic device 100 may search for the portable terminal device and perform wireless connection. Then, the electronic device 100 may output a content provided from the portable terminal device.

According to an embodiment, while a specific content or music is being output from the portable terminal device, the portable terminal device may be positioned around the electronic device, and then, if a predetermined gesture (e.g., a motion tap view) is detected through the display of the portable terminal device, the electronic device 100 may output the content or the music that is being output from the portable terminal device.

According to an embodiment, while a specific content or music is being output from the portable terminal device, if the portable terminal device gets close to the electronic device 100 by a predetermined distance or less (e.g., a non-contact tap view), or the portable terminal device contacts the electronic device 100 twice at short intervals (e.g., a contact tap view), the electronic device 100 may output the content or the music that is being output from the portable terminal device.

In the embodiments described above, it was described that the same screen as the screen provided at the portable terminal device is provided at the electronic device 100. However, the disclosure is not limited thereto. That is, in case connection between the portable terminal device and the electronic device 100 is constructed, a first screen provided by the portable terminal device may be output at the portable terminal device, and a second screen provided by the portable terminal device that is different from the first screen may be output at the electronic device 100. For example, the first screen may be a screen provided by a first application installed in the portable terminal device, and the second screen may be a screen provided by a second application installed in the portable terminal device. For example, the first screen and the second screen may be screens different from each other that are provided by one application installed in the portable terminal device. In addition, for example, the first screen may be a screen including a UI in a remote control form for controlling the second screen.

The electronic device 100 according to the disclosure may output a standby screen. For example, in case connection between the electronic device 100 and an external device was not performed, or there is no input received from an external device during a predetermined time, the electronic device 100 may output a standby screen. Conditions for the electronic device 100 to output a standby screen are not limited to the aforementioned examples, and a standby screen may be output by various conditions.

The electronic device 100 may output a standby screen in the form of a blue screen, but the disclosure is not limited thereto. For example, the electronic device 100 may obtain an atypical object by extracting only the shape of a specific object from data received from an external device, and output a standby screen including the obtained atypical object.

Figure 3A:
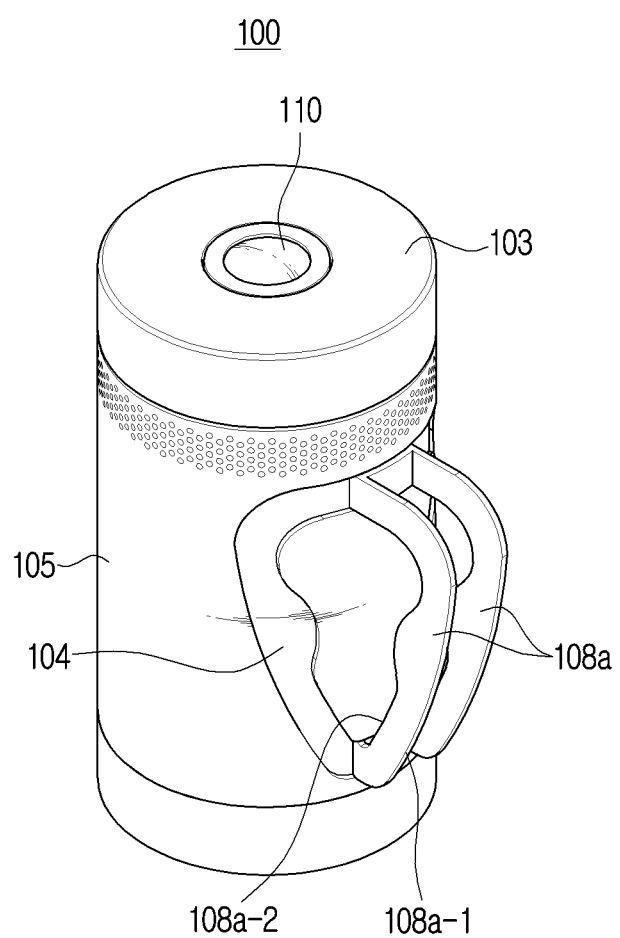
FIG. 3A to FIG. 3E are perspective views illustrating various exteriors of an electronic device according to an embodiment of the disclosure.

FIG. 3A is a perspective view illustrating the exterior of the electronic device 100 according to other embodiments of the disclosure. Referring to FIG. 3A, the electronic device 100 may include a support (or it is referred to as "a handle") 108a.

The support 108a according to various embodiments may be a handle or a ring that is provided for a user to grip or move the electronic device 100. In some embodiments, the support 108a may be a stand that supports the main body 105 while the main body 105 is laid in the side surface direction.

As illustrated in FIG. 3A, the support 108a may be connected in a hinge structure to be coupled to or separated from the outer circumferential surface of the main body 105, and may be selectively separated from or fixed to the outer circumferential surface of the main body 105 depending on a user's need. The number, the shape, or the arrangement structure of the support 108a may be implemented in various ways without restriction. Although not illustrated in the drawing, the support 108a may be built in the main body 105, and taken out and used by a user depending on needs. In some embodiments, the support 108a may be implemented as a separate accessory, and attached to or detached from the electronic device 100.

The support 108a may include a first support surface 108a-1 and a second support surface 108a-2. The first support surface 108a-1 may be a surface that faces the outer direction of the main body 105 while the support 108a is separated from the outer circumferential surface of the main body 105, and the second support surface 108a-2 may be a surface that faces the inner direction of the main body 105 while the support 108a is separated from the outer circumferential surface of the main body 105.

The first support surface 108a-1 may get farther away from the main body 105 as it unfolds from the lower portion of the main body 105 to the upper portion of the main body 105, and the first support surface 108a-1 may have a flat or uniformly curved shape. The first support surface 108a-1 may support the main body 105 in case the electronic device 100 is held in such a manner that the outer side surface of the main body 105 is in contact with the bottom surface, i.e., in case the electronic device 100 is arranged in such a manner that the projection lens 110 is toward the front surface direction. In an embodiment in which the electronic device 100 includes two or more supports 108a, the projection angle between the head 103 and the projection lens 110 may be adjusted by adjusting the interval or the hinge opening angle of the two supports 108a.

The second support surface 108a-2 is a surface that contacts a user or an external holding structure when the support 108a is supported by the user or the external holding structure, and may have a shape corresponding to a gripping structure of the user's hand or the external holding structure such that the electronic device 100 does not slip in case the electronic device 100 is supported or moved. The user may move the electronic device 100 by making the projection lens 110 face toward the front surface direction, and fixing the head 103 and holding the support 108a, and use the electronic device 100 like a flashlight.

The support groove 104 is a groove structure which is provided in the main body 105 and can accommodate the support 108a when the support 108a is not used, and as illustrated in FIG. 3A, the support groove 104 may be implemented as a groove structure corresponding to the shape of the support 108a on the outer circumferential surface of the main body 105. Through the support groove 104, the support 108a may be stored on the outer circumferential surface of the main body 105 when the support 108a is not used, and the outer circumferential surface of the main body 105 may be maintained to be sleek.

In some embodiments, the support 108a may be a structure that is stored inside the main body 105, and is taken out to the outside of the main body 105 in case it is used. In this case, the support groove 104 may be a structure that is inserted into the main body 105 to accommodate the support 108a, and the second support surface 108a-2 may include a door that adheres to the outer circumferential surface of the main body 105 or opens or closes the separate support groove 104.

Although not illustrated in the drawings, the electronic device 100 may include various kinds of accessories that are helpful in using or storing the electronic device 100. For example, the electronic device 100 may include a protection case so that the electronic device 100 can be easily carried while being protected. In some embodiments, the electronic device 100 may include a tripod that supports or fixes the main body 105, or a bracket that is coupled to the outer surface of the electronic device 100 and can fix the electronic device 100.

Figure 3B:
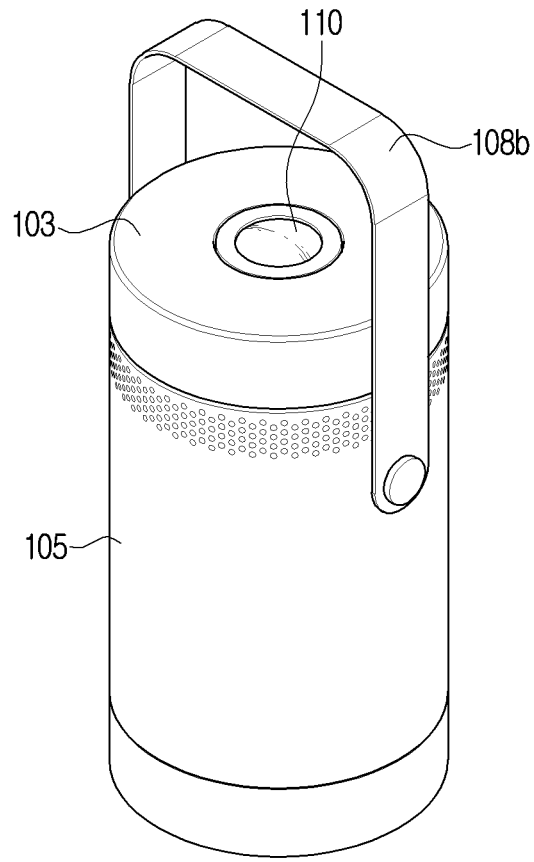

Referring to FIG. 3B, the electronic device 100 may include a support (or it is referred to as "a handle") 108b.

The support 108b according to various embodiments may be a handle or a ring that is provided for a user to grip or move the electronic device 100. In some embodiments, the support 108b may be a stand that supports the main body 105 to be oriented at any angle while the main body 105 is laid in the side surface direction.

As illustrated in FIG. 3B, the support 108b may be connected with the main body 105 at a predetermined point (e.g., the ⅔-¾ point) of the main body 105. If the support 108b is rotated in the direction of the main body, the support 108b may support the main body 105 to be oriented at any angle while the main body 105 is laid in the side surface direction.

Figure 3C:
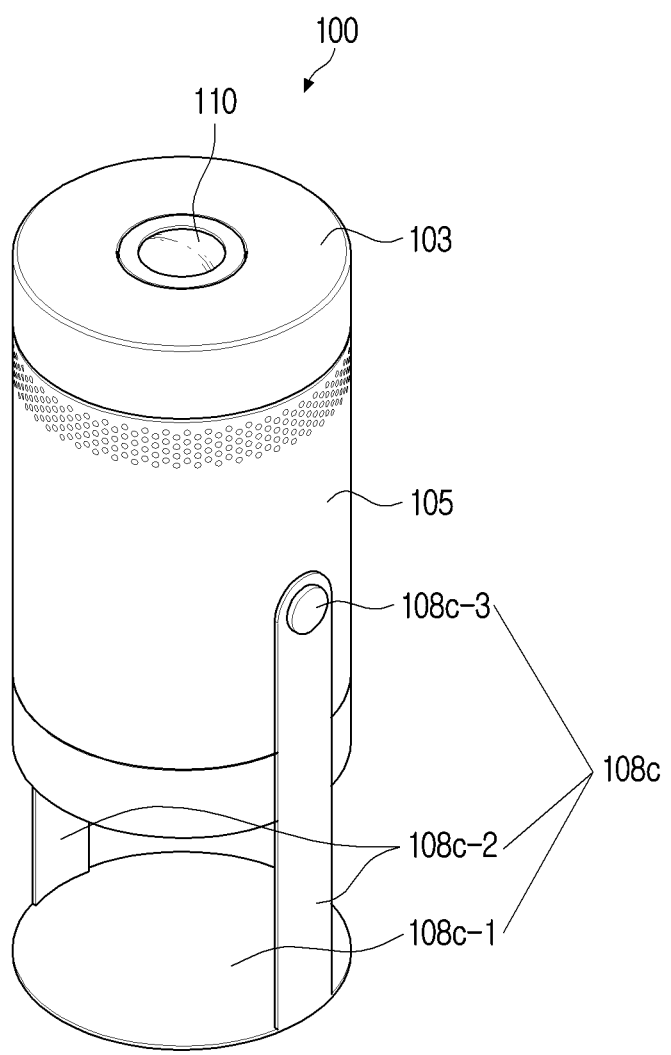

Referring to FIG. 3C, the electronic device 100 may include a support (or it is referred to as "a prop") 108c. The support 108c according to various embodiments may include a base plate 108c-1 provided to support the electronic device 100 on the ground, and two support members 108c-2 connecting the base plate 108c-1 with the main body 105.

According to an embodiment of the disclosure, the two support members 108c-2 have the same height, and one cross section of each of the two support members 108c-2 may be coupled to or separated from the main body 105 by a groove and a hinge member 108c-3 provided on one outer circumferential surface of the main body 105.

The two support members may be hinge-coupled to the main body 105 at a predetermined point (e.g., a ⅓ to ⅔ point of the height of the main body) of the main body 105.

When the two support members and the main body are coupled with each other by the hinge member 108c-3, the main body 105 may be rotated based on a virtual horizontal axis formed by the two binge members 108c-3, thus adjusting the projection angle of the projection lens 110.

Figure 3D:
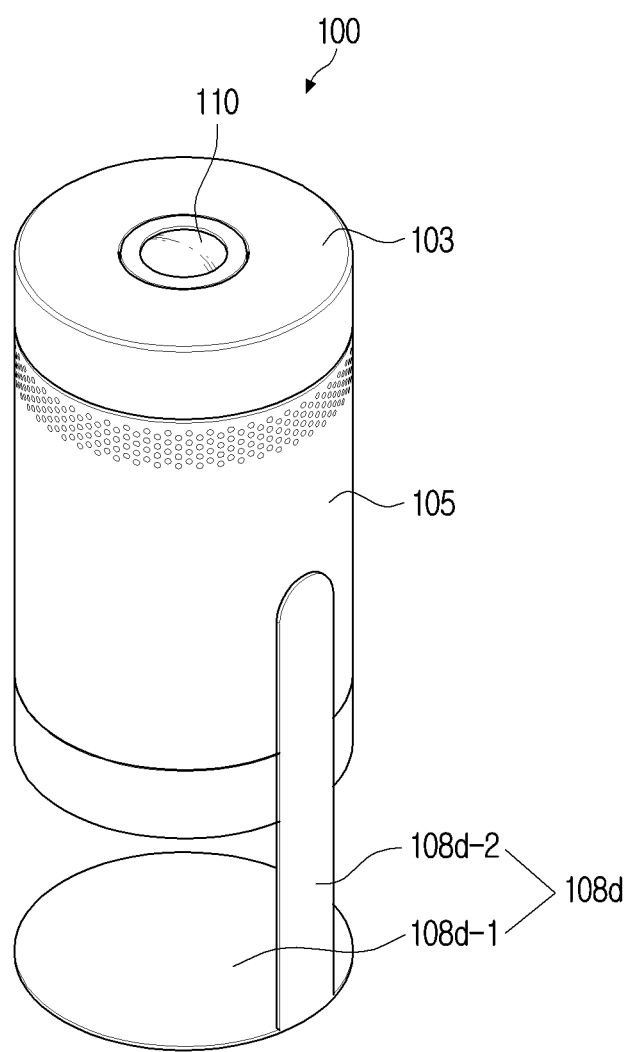
Figure 3E:
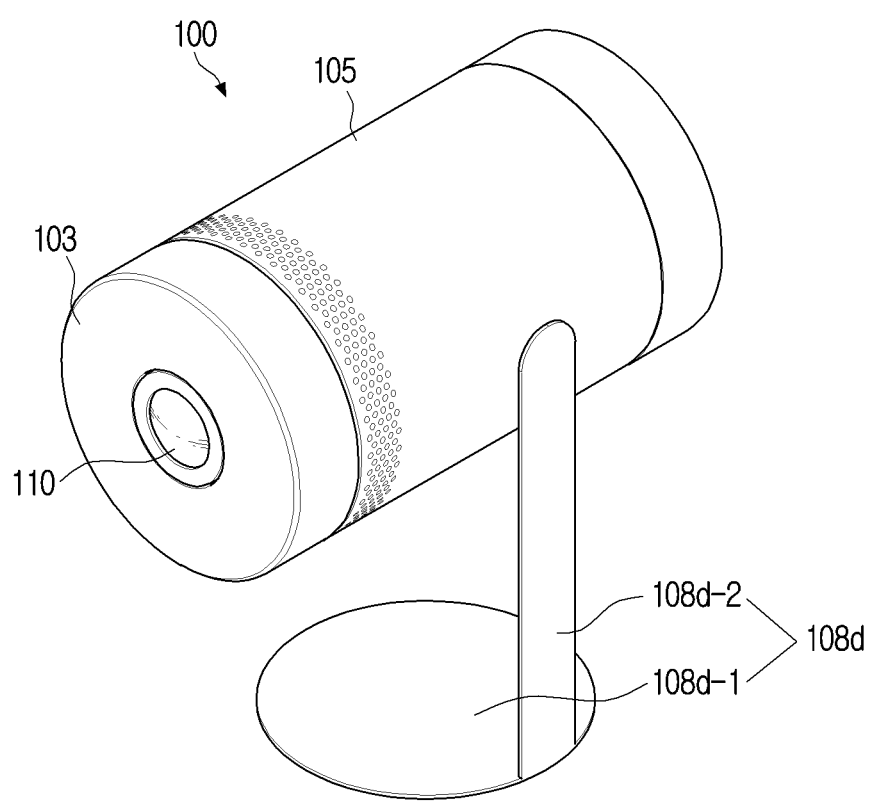

While FIG. 3C illustrates an embodiment in which the two support members 108c-2 are connected with the main body 105, the disclosure is not limited thereto, and as in FIG. 3D and FIG. 3E, one support member and the main body 105 may be connected with each other by one hinge member.

Referring to FIG. 3D and FIG. 3E, a support 108d according to various embodiments of the disclosure may include a base plate 108d-1 provided to support the electronic device 100 on the ground, and one support member 108d-2 connecting the base plate 108d-1 with the main body 105.

In addition, a cross section of the one support member 108d-2 may be coupled to or separated from the main body 105 by a groove and a hinge member provided on one outer circumferential surface of the main body 105.

If the one support member 108d-2 and the main body 105 are coupled with each other by one hinge member, the main body 105 may be rotated based on a virtual horizontal axis formed by the one hinge member, as in FIG. 3E.

According to embodiments, the support illustrated in FIG. 3A to FIG. 3E is an example, and the electronic device 100 can obviously include the support in various positions or shapes.

Figure 4A:
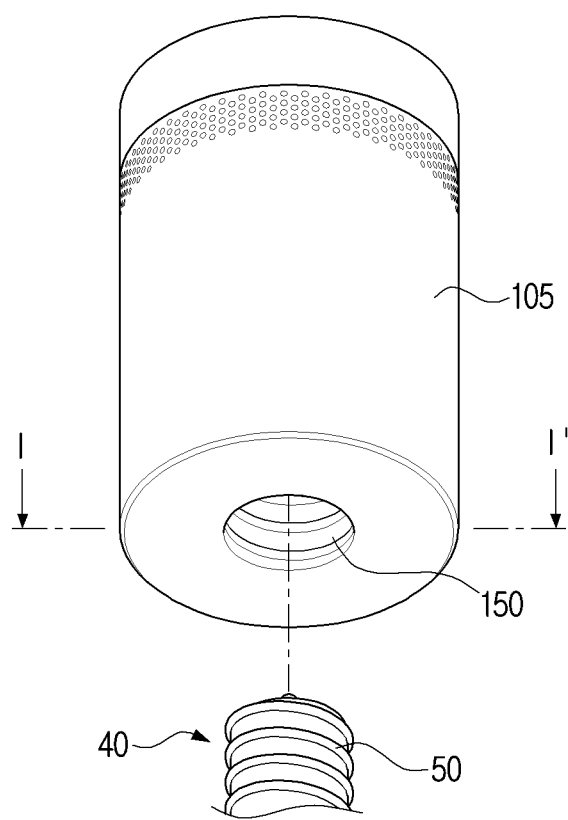
FIG. 4A and FIG. 4B are perspective views illustrating a socket of an electronic device according to an embodiment of the disclosure.
Figure 4B:
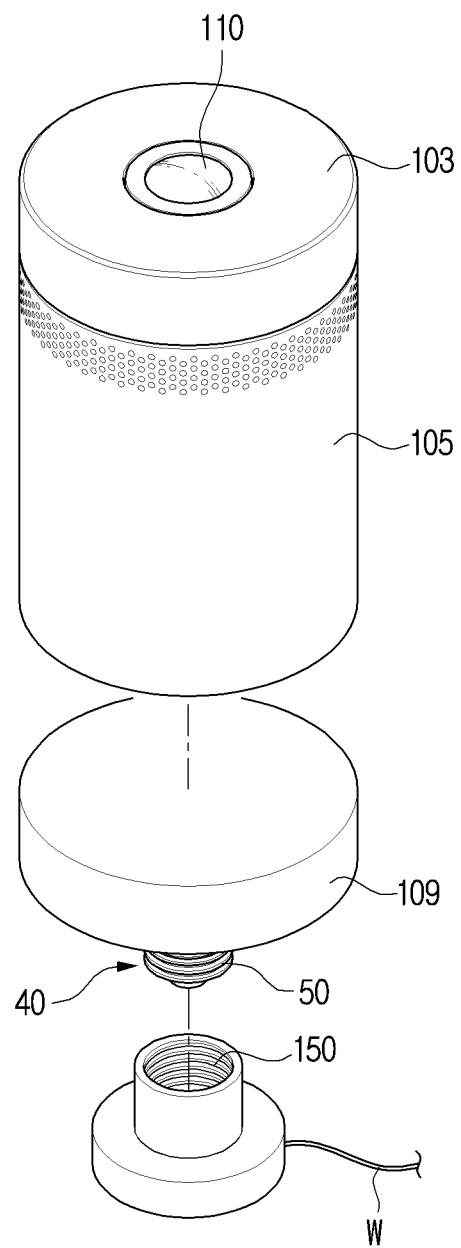

FIG. 4A and FIG. 4B are perspective views illustrating a socket 150 of the electronic device 100 according to an embodiment of the disclosure. Referring to FIG. 4A, the electronic device 100 according to the disclosure may include a socket 150 to which a light source 40 can be coupled.

The light source 40 may be an external optical device that can be coupled to the socket 150 of the electronic device 100. In some embodiments, the light source 40 can be included in the projection part 210 as one component of the electronic device 100. The light source 40 may receive power or an electric signal from the socket 150, and irradiate a light. The light source 40 may be implemented in various types, and for example, it may be an incandescent lamp that is used, or it may be one of a lamp, an LED, or laser.

The light source 40 may include a coupling part 50 that can be coupled to the socket 150. The coupling part 50 may be inserted into the socket 150 and fixed, and may have a shape corresponding to the socket 150. The coupling part 50 may consist of a conductive body, and the light source 40 may receive power or an electric signal from the power part 260 or the processor 270 through the socket 150.

In FIG. 4A, the upper part of the coupling part 50 of the light source 40 was omitted, but in the upper part of the light source 40, a light emitting structure of a light bulb or a lamp that is used may be formed. For example, the light emitting structure may be a glass tube, a filament, or a light emitting diode (LED). According to an embodiment, to the upper part of the light source 40, the head 103 including the light emitting structure and the projection lens 110 may be coupled. However, the disclosure is not limited thereto, and light emitting structures of various types and shapes may be coupled.

To the socket 150, the coupling part 50 of the light source 40 may be coupled, and the socket 150 may provide power and transmit an electric signal to the light source 40. The coupling structure of the socket 150 and the coupling part 50 of the light source 40 may be implemented in various ways, and the socket 150 may have various socket structures such as E40, E27, E26, E14, GU, B22, BX, BA, EP, EX, GY, GX, GR, GZ, and G types, so that it can correspond to a conventional lighting device.

The coupling part 50 of the light source 40 illustrated in FIG. 4A is one exemplary coupling structure of the light source 40, and in actual implementation, the disclosure is not limited thereto, and the electronic device 100 according to the disclosure may have socket 150 structures corresponding to the various shapes and structures of the light source 40.

As the coupling part 50 of the light source 40 can be coupled to or separated from the socket 150, if a different substance, for example, a light source that does not match the specification of the socket 150, an external electronic product, a metal material, or a part of a user's body, etc. are inserted into the socket 150 while the coupling part 50 of the light source 40 is separated, there is a risk of an electric shock through the electrode inside the socket 150.

Referring to FIG. 4B, the positions of the socket 150 and the light source 40 may be implemented in a reverse manner from the structure in FIG. 4A. According to embodiments, the light source 40 may be included in the projection part 210 as one component of the electronic device 100 and arranged on the side of the main body 105, and the socket 150 may be arranged to be selectively coupled with the coupling part 50 of the light source 40.

That is, the electronic device 100 in FIG. 4B may have a coupling structure wherein the female part and the male part were changed reversely compared to the electronic device 100 illustrated in FIG. 4A. The electronic devices 100 in FIG. 4A and FIG. 4B may have the same specifications and sizes, while only the positions of the socket 150 and the light source 40 were changed.

The electronic device 100 may include a connection part 109 that can be detached from the main body 105. The connection part 109 may have a cylindrical shape, and may be formed of the same material as the main body 105 and have a cross section of the same size as the main body 105. Accordingly, if the connection part 109 is coupled to the main body 105, the main body 105 and the connection part 109 may have a cylindrical shape as an integrated body. The connection part 109 may be coupled to the main body 105 through a screw coupling method, a key-groove coupling method, a hook coupling method, etc., but coupling methods are not limited thereto.

The light source 40 may be arranged to protrude toward the socket 150 from one surface of the connection part 109. Accordingly, in the case of intending to provide power to the light source 40, a user may attach the connection part 109 to the main body 105, and couple the coupling part 50 of the light source 40 arranged on the connection part 109 to the socket 150.

The socket 150 may be connected to a wire W, and receive AC power from the outside through the wire W, and transmit the power to the coupling part 50 of the light source 40. Accordingly, the light source 40 may receive power or an electric signal from the socket 150, and irradiate a light.

Hereinafter, a configuration and an operation wherein the electronic device 100 and a control method thereof according to an embodiment of the disclosure control power supply by detecting whether the coupling part 50 of the light source 40 is normally coupled to the socket 150 will be described in detail with reference to FIG. 5A to FIG. 8.

Figure 5A:
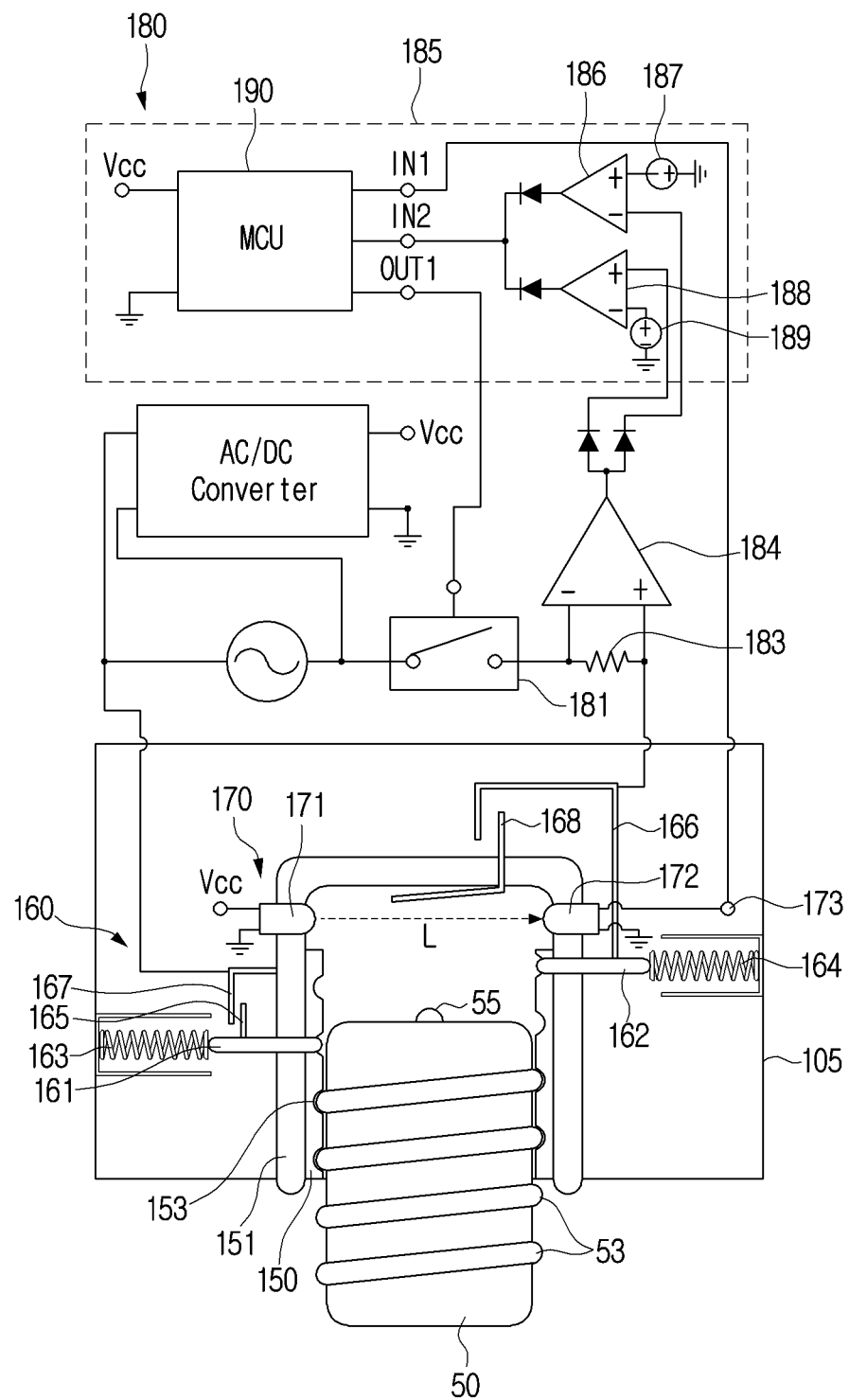
FIG. 5A is a diagram illustrating a coupling process of a socket of an electronic device according to an embodiment of the disclosure.
Figure 5B:
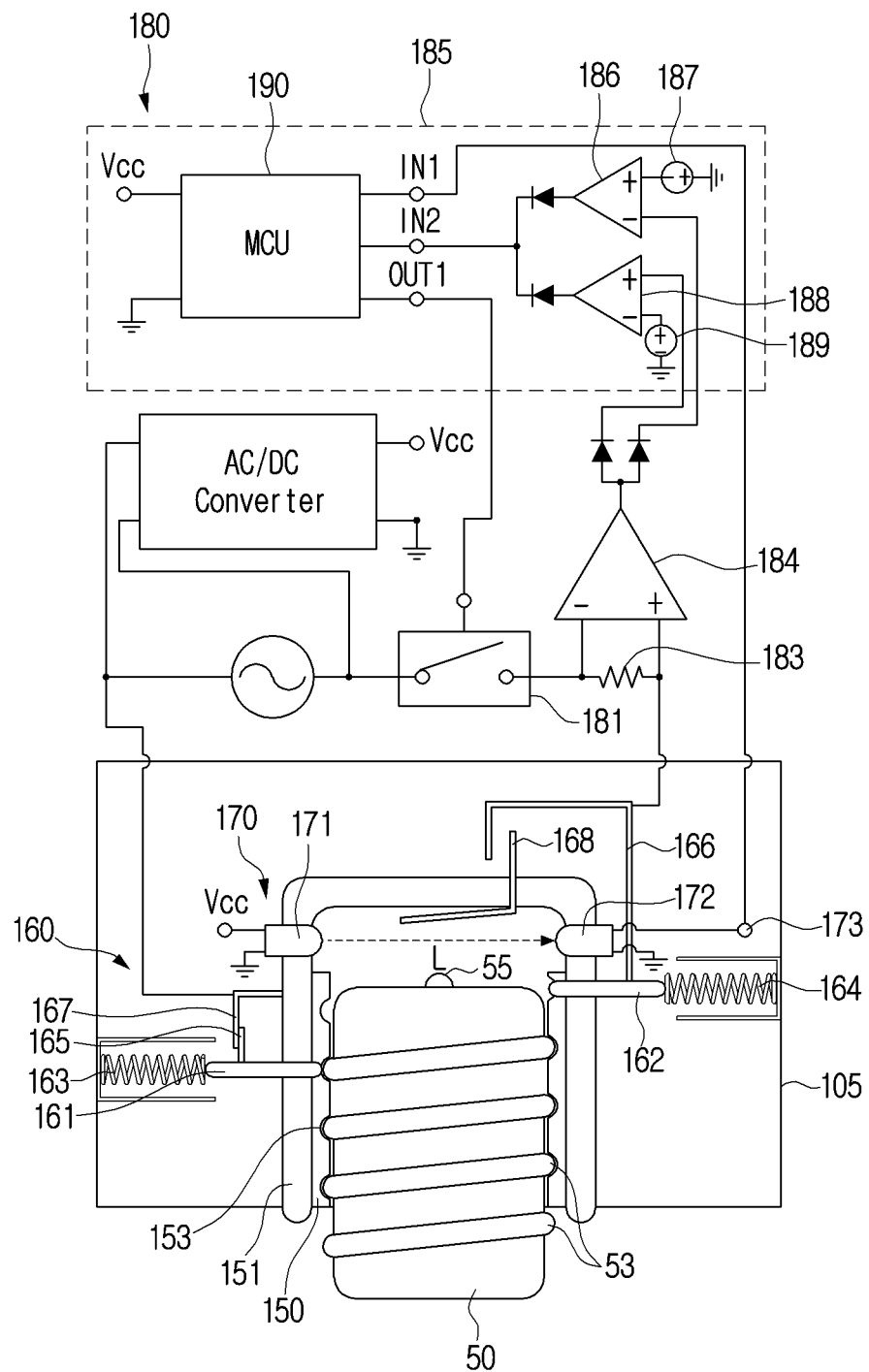
FIG. 5B is a diagram illustrating a coupling process of a socket of an electronic device according to an embodiment of the disclosure.
Figure 5C:
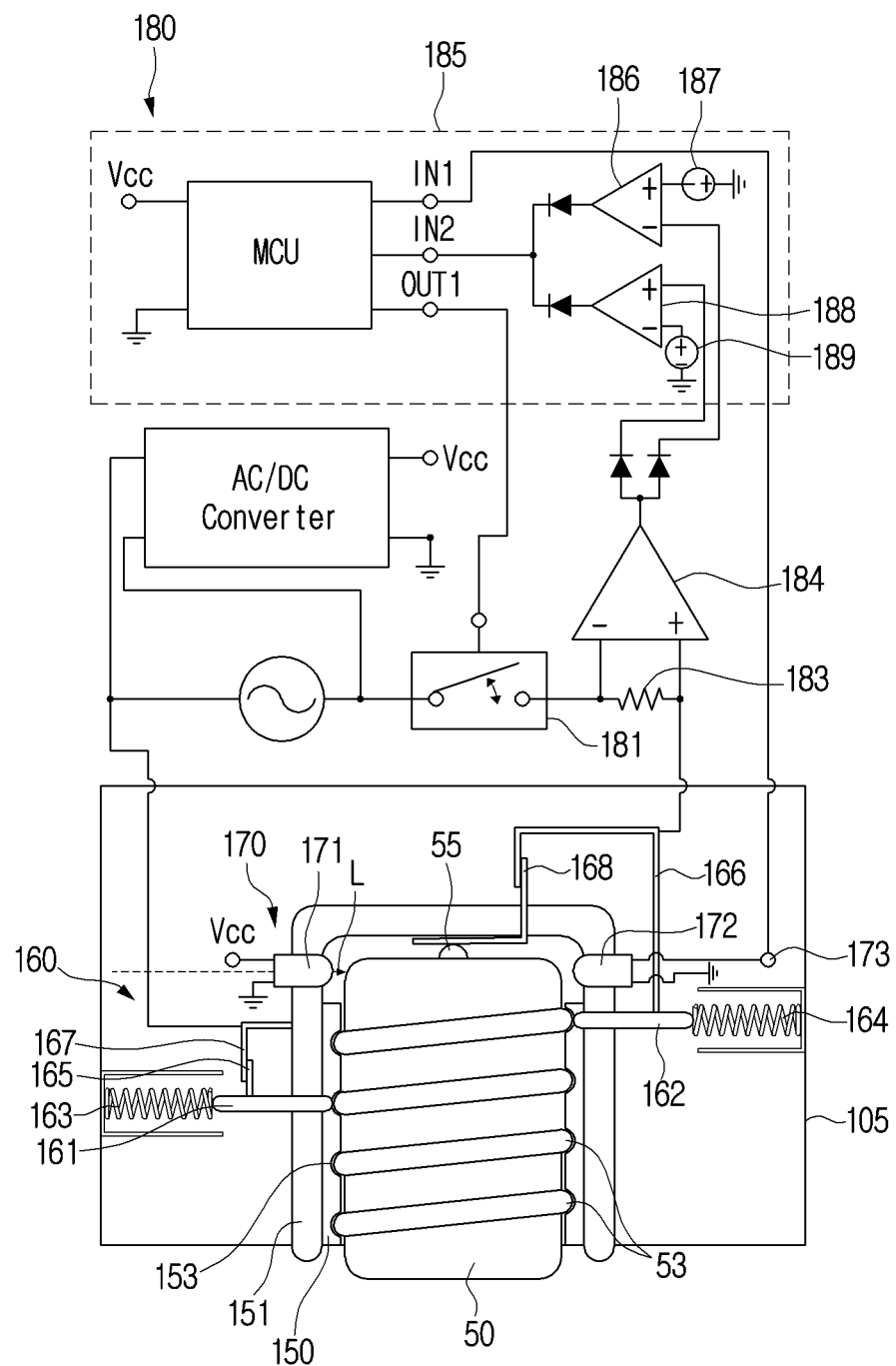
FIG. 5C is a diagram illustrating a coupling process of a socket of an electronic device according to an embodiment of the disclosure.

FIG. 5A to FIG. 5C are diagrams illustrating a coupling process of the socket 150 of the electronic device 100 according to an embodiment of the disclosure. According to embodiments, FIG. 5A to FIG. 5C are diagrams schematically illustrating the cross-section structure and the circuit diagram of a partial area of the electronic device 100 based on the I-I' line in FIG. 4A.

Referring to FIG. 5A to FIG. 5C, the electronic device 100 according to an embodiment of the disclosure may include a first sensor 160, a second sensor 170, and a galvanizing device 180.

In FIG. 5A to FIG. 5C, a configuration wherein the coupling part 50 of the light source 40 is coupled to the socket 150 is illustrated. However, in actual implementation, the disclosure is not limited thereto, and a light source that does not match the specification, an external electronic product, a metal material, or a part of a user's body, etc. may be inserted into the socket 150, and such external structures that are inserted into the socket 150 will be referred to as 'an object' hereinafter.

Also, the circuit and configuration diagrams in FIG. 5A to FIG. 5C are exemplary configurations for explaining the configuration of the electronic device 100 according to an embodiment of the disclosure. Thus, in actual implementation, the disclosure is not limited thereto, and the configuration can be modified in various ways within a range that is obvious to a person skilled in the art so that an identical or a similar driving can be implemented.

The electronic device 100 according to an embodiment may include a micro controller unit (referred to as 'an MCU' hereinafter) 190 that controls the power transmission structure of the socket 150. The MCU 190 may be the aforementioned processor 270, or may be a controller unit which is one component of the processor 270 for controlling the power of the socket 150.

The MCU 190 according to an embodiment of the disclosure may perform a control operation for maintaining or blocking power transmission to the socket 150, based on a result transmitted from the galvanizing device 180. According to embodiments, some components of the MCU 190 and the galvanizing device 180 that will be described below can identify whether a current flowing through the socket 150 exceeded the safety range, and control the switch 181 based on this identification, and such components used for control of the switch 181 may be referred to as a switch controller 185.

The MCU 190 may receive an applied voltage Vcc from the power part 260, and the MCU 190 may provide the applied voltage Vcc to the AC/DC converter and the second sensor 170. The AC/DC converter may convert the applied voltage Vcc to a direct current—an alternating current form, and provide power to the socket 150.

The electronic device 100 may include a first sensor 160 and a second sensor 170 that can detect whether an external object such as the coupling part 50 of the light source 40 is inserted into the socket 150, and provide a detection result to the processor 270. In FIG. 5A to FIG. 5C, a process wherein the coupling part 50 of the light source 40 is inserted into the socket 150 is sequentially illustrated, but in actual implementation, a different object other than the coupling part 50 of the light source 40 may be inserted into, and power supply may be blocked through a process wherein the first sensor 160 and the second sensor 170 and the galvanizing device 180 detect the different object.

The socket 150 may have a shape corresponding to the coupling part 50 of the light source 40. For example, the coupling part 50 may have a structure of a male screw or a bolt including a thread 53, and the socket 150 may have a structure of a female screw equipped with an accommodating groove 153 that accommodates the thread 53 of the coupling part 50. In this case, the coupling part 50 may be rotated and inserted into the socket 150, and fixed.

The socket 150 may include a socket housing 151 consisting of a non-conducting body. The socket housing 151 may accommodate and fix some components of the first sensor 160 or the second sensor 170. In the socket housing 151, a first electrode 167 and a second electrode 168 supplying power to an object inside the socket 150 are built in, and thus the socket housing 151 can support and fix the coupling part 50, the first electrode 167, and the second electrode 168.

The first sensor 160 and the second sensor 170 may include one of the first sensor 160 or the second sensor 170, or include both of the first sensor 160 and the second sensor 170. Each of the first sensor 160 and the second sensor 170 may detect whether an object is inserted into the socket 150 by an operation method of its own, and provide the detection result to the processor 270.

The first sensor 160 may include a first button 161 and a second button 162 that protrude toward the inside of the socket 150 and are pushed to the outer side and move when an object is inserted into, and a first spring 163 and a second spring 164 that provide an elastic force while supporting the first button 161 and the second button 162. One end of the first button 161 and the second button 162 may be formed in the accommodating groove 153 of the socket 150, and the other end may be arranged to contact the first spring 163 and the second spring 164.

When an object is inserted into the socket 150, the first button 161 and the second button 162 may be pushed and move to the outside direction of the socket 150, and when the object is separated from the socket 150, the first button 161 and the second button 162 may receive an elastic force from the first spring 163 and the second spring 164 and move to the inside direction of the socket 150.

The first button 161 and the second button 162 may include a first conductor part 165 and a second conductor part 166. The first conductor part 165 and the second conductor part 166 may be fixed on the first button 161 and the second button 162, and may be moved and fixed together with the first button 161 and the second button 162.

The first sensor 160 may include the first button 161 and the second button 162 to be arranged to be spaced apart inside the socket 150. The first sensor 160 may include the first spring 163 and the second spring 164 to correspond to each of the first button 161 and the second button 162, and each of the first button 161 and the second button 162 may include the first conductor part 165 and the second conductor part 166.

The first electrode 167 may contact or may be separated from the first conductor part 165 of the first button 161 based on the movement of the first button 161, and the second electrode 168 may contact or may be separated from the second conductor part 166 of the second button 162 based on the movement of the second button 162. Thus, the first electrode 167 and the second electrode 168 may provide or block a current to the socket 150 by the first sensor 160.

Referring to FIG. 5A and FIG. 5B, a process wherein the first button 161 is pushed by the coupling part 50 and moves can be identified. If at least a part of the coupling part 50 is inserted into the socket 150, the coupling part 50 may push and move the first button 161, and the first conductor part 165 of the first button 161 may move and contact or may be electrically connected with the first electrode 167, and accordingly, the first electrode 167 may provide an alternating voltage to the socket 150.

As illustrated in FIG. 5B, in case the coupling part 50 moved only to the middle location of the socket 150, the second button 162 may not move even if the first button 161 is pushed and moves. As the second electrode 168 is in a state of having been separated from the second conductor part 166 of the second button 162, the socket 150 may not receive power normally.

If a different object other than the coupling part 50, e.g., a coupling part of a light source having a different specification, a conductive material, a user's body, etc. are inserted into the socket 150, the socket 150 cannot supply power unless both of the first button 161 and the second button 162 are pushed and move. For example, in case a user pushes only one of the first button 161 and the second button 162, the socket 150 may not receive power, and thus the electronic device 100 can prevent a risk that the user may get an electric shock.

Referring to FIG. 5B and FIG. 5C, a process wherein the second button 162 is pushed by the coupling part 50 and moves can be identified. If the coupling part 50 is inserted into the socket 150 more, the coupling part 50 may push and move the second button 162. The second conductor part 166 of the second button 162 may move and contact or may be electrically connected with the second electrode 168, and the first electrode 167 and the second electrode 168 may provide an alternating voltage to the socket 150.

That is, the first sensor 160 may have a structure wherein, if a coupling part 50 of a light source 40 of an appropriate specification is inserted into the socket 150, the first button 161 and the second button 162 are pushed, but if a different object is inserted, at least one of the first button 161 or the second button 162 is not pushed, and through this action, the first sensor 160 may detect insertion of an appropriate object into the socket 150.

The first sensor 160 may maintain or block power supply to the socket 150 based on an object inserted into the socket 150, and may prevent a leakage current of the electronic device 100 through a method of blocking power. Also, the first sensor 160 may supply and block power of the socket 150 mechanically without separate transmission of a signal by the processor 270 or the MCU 190.

The second sensor 170 may be an optical sensor including a light emitting part 171 that irradiates a light L inside the socket 150, a light receiving part 172 that is spaced from the light emitting part 171 and recognizes the light L, and a transmission part 173 that detects the recognition state of the light L of the light receiving part 172 and transmits the state to the MCU 190. The light emitting part 171 and the light receiving part 172 according to an embodiment may irradiate and recognize infrared rays L, and the second sensor 170 may be an infrared sensor.

At least one of the light emitting part 171 or the light receiving part 172 may be arranged in a location adjacent to the end part of the coupling part 50 when coupling of the coupling part 50 to the socket 150 is completed. The light emitting part 171 may irradiate the light L by a predetermined interval, or consistently irradiate the light L. When coupling of the coupling part 50 to the socket 150 is completed, the coupling part 50 may be located in a space by which the light emitting part 171 and the light receiving part 172 are spaced.

The transmission part 173 may transmit a state that the light receiving part 172 recognizes the light L to a first input part IN1 of the MCU 190. For example, a state wherein the light receiving part 172 recognizes the light L may be referred to as a High state or an S1 (refer to FIG. 6A) state, and a state wherein the light receiving part 172 cannot recognize the light L or the recognized light amount has been reduced by a specific level or more may be referred to as a Low state or an S2 (refer to FIG. 6A) state.

The light receiving part 172 may consistently recognize the light L from the light emitting part 171. As illustrated in FIG. 5A and FIG. 5B, in case there is not any obstacle between the light receiving part 172 and the light emitting part 171, the transmission part 173 may maintain the S1 state.

As illustrated in FIG. 5C, in case the coupling part 50 is coupled inside the socket 150, or an external object comes in and blocks between the light receiving part 172 and the light emitting part 171, the light L irradiated from the light emitting part 171 gets to be blocked by the obstacle, and the light L reaching the light receiving part 172 may be reduced.

The light receiving part 172 may detect a change of the light L, and provide the detection result to the transmission part 173. The S1 and S2 states of the transmission part 173 may be transmitted to the MCU 190 through the first input part IN1, and the MCU 190 may control the driving of the switch 181 based on this transmission.

The switch 181 may control provision of a current to the socket 150. For example, the switch 181 may be turned on and provide a current to the socket 150, or may be turned off and block a current to the socket 150.

The switch 181 may be arranged on a route that continues from the AC/DC converter to the first electrode 167 and the second electrode 168 of the socket 150. The switch 181 may be controlled by the MCU 190, and the MCU 190 may control the switch 181 based on the sensor and the galvanizing device 180.

Due to various factors such as aging, an external shock, overheating, and breakage of the electronic device 100, there is a possibility that the first sensor 160 or the second sensor 170 may misrecognize even if an appropriate coupling part 50 was not inserted into the socket 150. The electronic device 100 according to an embodiment of the disclosure may include the first sensor 160 and the second sensor 170, and prevent a risk of an electric shock of the electronic device 100 in a case wherein a malfunction or an error occurred in any one sensor.

For example, in case an inappropriate external object was inserted into the socket 150, and the first button 161 and the second button 162 of the first sensor 160 were pushed and the first electrode 167 and the second electrode 168 are connected with the AC/DC converter, if the second sensor 170 maintains the S1 state, the MCU 190 may block power supply of the socket 150 while maintaining the switch 181 in an off state. Also, in case an inappropriate external object was inserted into the socket 150 and the second sensor 170 converts to the S2 state, unless both of the first button 161 and the second button 162 are pushed, the first sensor 160 may block power supply of the socket 150.

In the electronic device 100 according to the disclosure, even if one of the first sensor 160 or the second sensor 170 malfunctions, the other one may block current supply to the socket 150, and thus the electronic device 100 may have a dual safety device function of preventing an electric shock by insertion of an object into the socket 150. Further, the electronic device 100 according to the disclosure may have a triple safety function through the galvanizing device 180 that will be described below.

The galvanizing device 180 is a device that detects a current flowing through the socket 150, and may include a galvanizing resistance 183 that is arranged in a route wherein a current flowing through the socket 150 moves, an amplifier 184 that measures and amplifies a voltage of the galvanizing resistance 183, and comparators 186, 188 that receive the voltage of the amplifier 184 and compare the voltage with a preset voltage value, and provide the voltage to the MCU 190.

The galvanizing resistance 183 according to an embodiment may be serially connected with the switch 181, and when the switch 181 is turned on and a voltage is applied to the socket 150, a voltage, i.e., a galvanizing voltage hereinafter, may also be applied to the galvanizing resistance 183. The galvanizing resistance 183 is a resistance for detecting normal coupling of the socket 150, and for minimizing power loss when the socket 150 normally receives a current, a resistance value of the galvanizing resistance 183 may be set to be very low.

The galvanizing device 180 may include the amplifier 184, and may thereby amplify a voltage value of the galvanizing resistance 183. When a galvanizing voltage is applied to both ends of the galvanizing resistance 183, the amplifier 184 may amplify the galvanizing voltage of the galvanizing resistance 183, and transmit the voltage to the comparators 186, 188.

The comparators 186, 188 may include the first comparator 186 and the second comparator 188. The first comparator 186 may compare a galvanizing voltage amplified when the galvanizing voltage is a forward voltage and a predetermined first voltage value V1 (refer to FIG. 6A), and the second comparator 188 may compare a galvanizing voltage amplified when the galvanizing voltage is a reverse voltage and a predetermined second voltage value V2 (refer to FIG. 6A).

According to embodiments, the first comparator 186 may be connected to a first voltage source 187 having the first voltage value V1, and transmit a high or a low output to one diode of the second input part IN2 according to whether the amplified galvanizing voltage is bigger than the first voltage value V1. The second comparator 188 may be connected to a second voltage source 189 having the second voltage value V2, and transmit a high or a low output to another diode of the second input part IN2 according to whether the amplified galvanizing voltage is smaller than the second voltage value V2.

Outputs of the first comparator 186 and the second comparator 188 may respectively go through the diodes, and may be transmitted to the second input part IN2 of the MCU 190. The MCU 190 may predict the value of a current flowing through the socket 150 based on the input result of the second input part IN2, and may control the switch 181 through the first output part OUT1 based on this prediction.

Figure 6A:
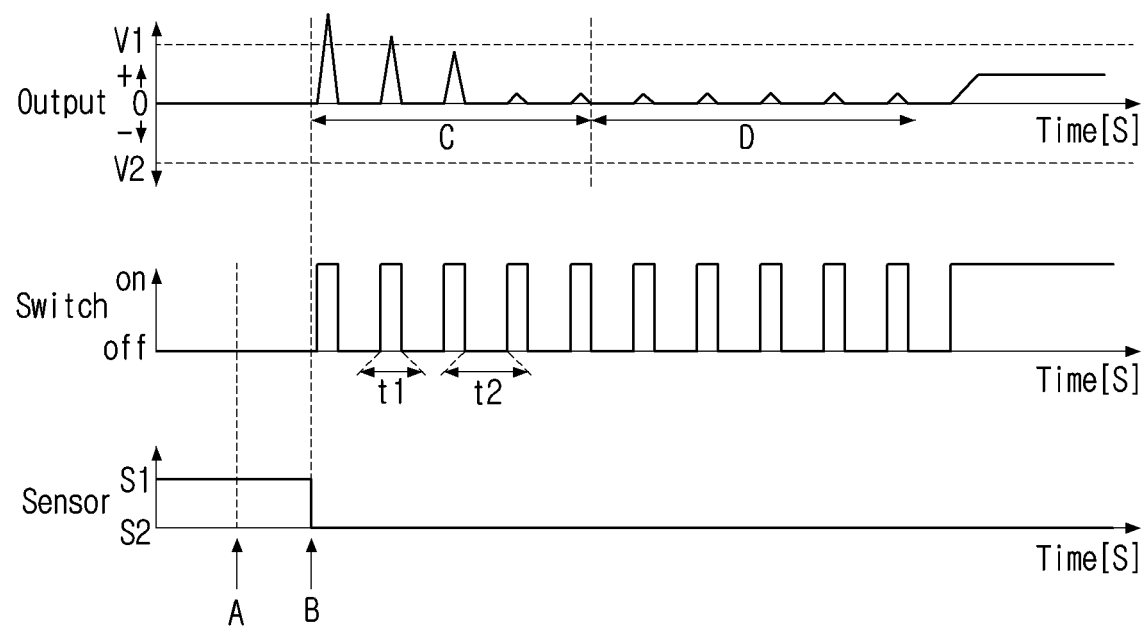
FIG. 6A is a graph illustrating a control method of an electronic device according to an embodiment of the disclosure.
Figure 6B:
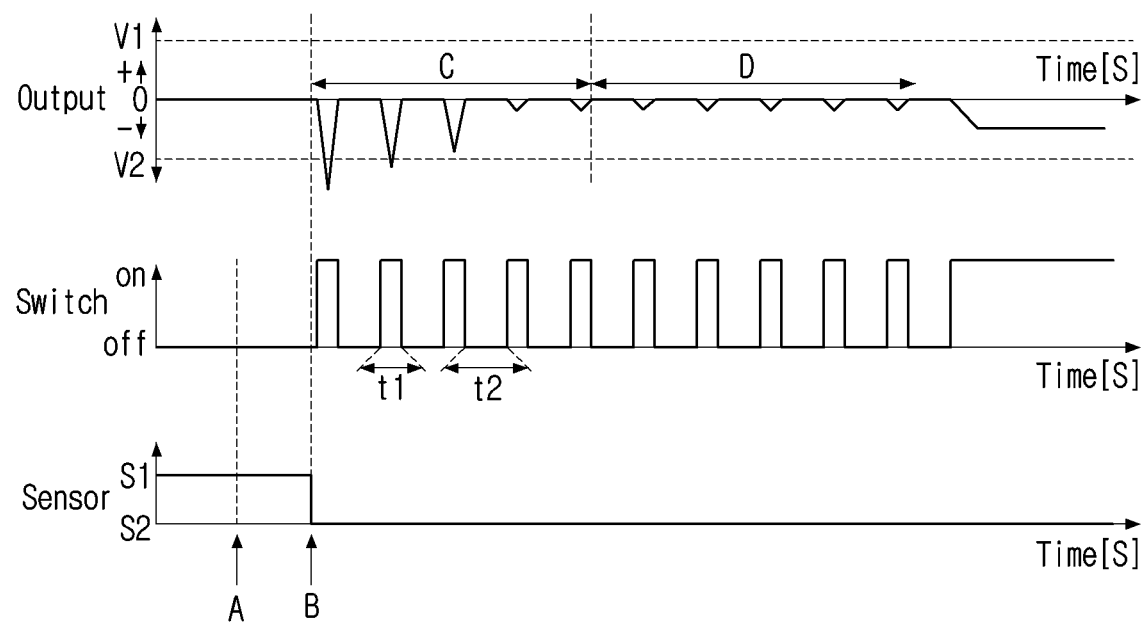
FIG. 6B is a graph illustrating a control method of an electronic device according to an embodiment of the disclosure.

FIG. 6A is a graph illustrating a control method of the electronic device 100 according to an embodiment of the disclosure, and FIG. 6B is a graph illustrating a control method of the electronic device 100 according to an embodiment of the disclosure.

Hereinafter, operations of the first sensor 160, the second sensor 170, the switch 181, and the galvanizing device 180 will be described in detail with reference to FIG. 6A and FIG. 6B.

The S1 of the first sensor 160 and the second sensor 170 may be a state wherein an object was not inserted into or was not completely inserted into the socket 150, and S2 may be a state wherein an object was completely inserted into the socket 150 and coupled. For example, if the light receiving part 172 of the second sensor 170 cannot recognize the light L or the light amount is reduced, the second sensor 170 may detect insertion of an object, and change from the S1 state to the S2 state.

The A time point may be the state in FIG. 5B wherein an object was inserted to the middle point of the socket 150, or a state wherein one of the first sensor 160 or the second sensor 170 recognized insertion of an object. The B time point may be the state in FIG. 5C wherein an object was completely inserted into the socket 150 and coupled, or a state wherein both of the first sensor 160 and the second sensor 170 recognized insertion of an object.

In the case of reaching the B time point, if insertion of an object into the socket 150 is detected, the MCU 190 may control the switch 181 during a preset galvanization time. For example, if insertion of an object into the socket 150 is detected, the MCU 190 may control the switch 181 such that the on state and the off state of the switch 181 are sequentially repeated during the preset galvanization time.

According to embodiments, the MCU 190 may repeat a cycle wherein the switch 181 is turned on during a preset first time t1 and the switch 181 is turned off during a preset second time t2 during the galvanization time a plurality of times. The first time t1 and the second time t2 may be short time intervals, and for example, the first time t1 may be a time within a range of scores of micro seconds, and the second time t2 may be a time within a range of hundreds of micro seconds. The electronic device 100 according to the disclosure can reduce a risk of an electric shock in case an object inserted into the socket 150 is an inappropriate object through a swift galvanizing process.

If the switch 181 repeats on and off, a galvanizing voltage may be applied to both ends of the galvanizing resistance 183, and the galvanizing device 180 may receive an output value (Output) of the galvanizing voltage that went through the amplifier 184. The galvanizing device 180 may identify whether the output value (Output) of the amplifier 184 is within a predetermined range, and may transmit data regarding the value of the current flowing through the socket 150 to the MCU 190 based on this identification.

If the output value (Output) is measured to be bigger than the first voltage value V1 or measured to be smaller than the second voltage value V2, the MCU 190 may identify that a voltage of an expected value or bigger was applied to the galvanizing resistance 183, and may determine the object inserted into the socket 150 as an inappropriate object based on this identification and turn off the switch 181. The first voltage value V1 and the second voltage value V2 may be set to be diverse according to the type of the electronic device 100 and the type and the specification of the light source 40, and the amplification multiplier of the amplifier 184, etc., and they may be, for example, around 10 V.

The MCU 190 according to an embodiment may ignore the output value (Output) during a first standby time C which is the initial time during the galvanization time, and set the time after that as a galvanization time D. Then, the MCU 190 may determine the on state of the switch 181 based on the output value (Output) measured during the galvanization time D. In case a condenser of a big capacity of an SMPS input end is included inside the light source 40, an inrush current may be generated during the initial time, and thus the output value (Output) in the initial time may be ignored.

The first standby time C may be set within a preset time range, or it may be an initial cycle of a preset number of times among the plurality of cycles wherein the switch 181 is turned on or off. For example, in FIG. 6A to FIG. 7, the initial cycle of five times was set as the first standby time, and may be set in various ways according to the driving environment of the electronic device 100.

After the first standby time C, the MCU 190 may repeat on and off of the switch 181 during the preset galvanization time D, and determine whether the output value (Output) is stable. The galvanization time D may be set within the preset time range, or it may be a latter cycle of a preset number of times among the plurality of cycles wherein the switch 181 is turned on or off.

Referring to FIG. 6A, it can be identified that the output value (Output) is bigger than the first voltage value V1 by the inrush current in the initial time when the output value (Output) is a forward voltage, but the value is stabilized during the galvanization time D after the first standby time C, and has a numerical value within the first voltage value V1. If the output value (Output) during the first standby time C and the galvanization time D is within the first voltage value V1 and the second voltage value V2, the MCU 190 may control the switch 181 such that current supply to the socket 150 is maintained after the galvanization time D.

Referring to FIG. 6B, it can be identified that the output value (Output) is smaller than the second voltage value V2 by the inrush current in the initial time when the output value (Output) is a reverse voltage, but the value is stabilized during the galvanization time D after the first standby time C, and has a numerical value within the second voltage value V2. If the output value (Output) during the first standby time C and the galvanization time D is within the first voltage value V1 and the second voltage value V2, the MCU 190 may control the switch 181 such that current supply to the socket 150 is maintained after the galvanization time D.

The MCU 190 may ultimately measure the range of a value of a current flowing through the socket 150 through the data of the galvanizing device 180, and measure whether a value of a current flowing through the socket 150 is within the first current value V1 which is a preset positive value and the second current value V2 which is a preset negative value, and determine whether to maintain the on state of the switch 181 based on this measurement.

Figure 7:
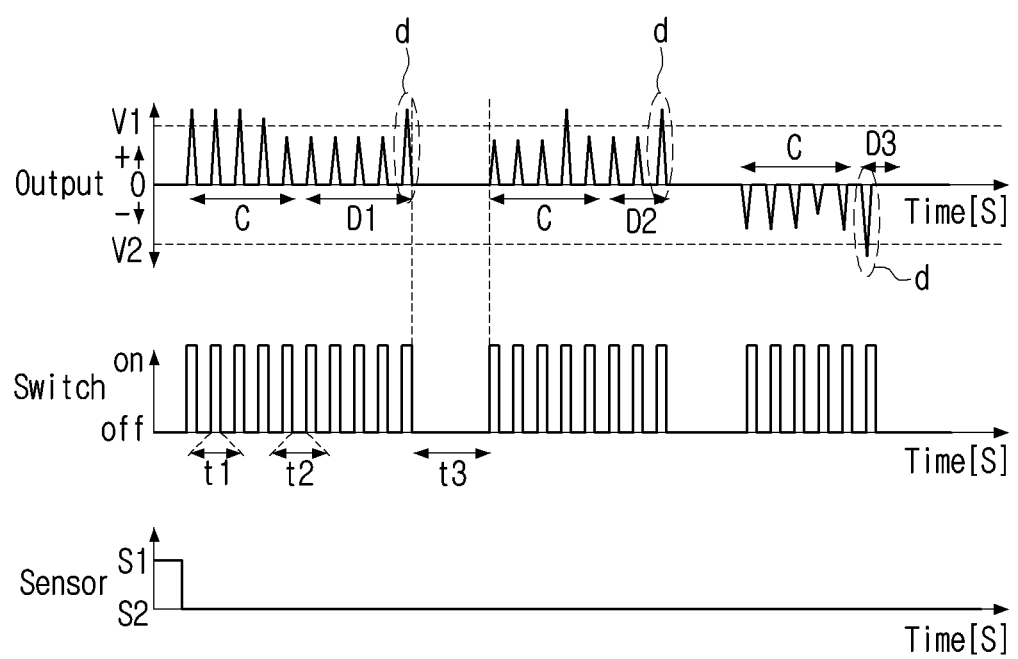
FIG. 7 is a graph illustrating a control method of an electronic device according to an embodiment of the disclosure.

FIG. 7 is a graph illustrating a control method of the electronic device 100 according to an embodiment of the disclosure.

According to embodiments, FIG. 7 is a graph illustrating simulation of an operation of the electronic device 100 in case an inappropriate object was inserted into the socket 150.

The galvanizing device 180 may detect a point d wherein the output value (Output) exceeded the first voltage value V1 during the primary galvanization time D1 after the first standby time C, and transmit the point to the MCU 190. If the output value (Output) is greater than or equal to the first voltage value V1 or exceeds the value, the MCU 190 may identify that the current flowing through the socket 150 exceeded the first current value and is in an overcurrent state, and turn off the switch 181 to block the current flowing through the socket 150.

When an overcurrent state is identified as illustrated in FIG. 7, the MCU 190 according to an embodiment may maintain the off state of the switch 181 during the preset second standby time t3. The MCU 190 may turn off the switch 181, and then turn on and off the switch 181 again to proceed with the galvanization time D2.

The MCU 190 may repeat on and off of the switch 181 again after the second standby time t3. After the first standby time C, the MCU 190 may proceed with galvanization again during the secondary galvanization time D2 after the first standby time C. Referring to FIG. 7, the MCU 190 may detect the point d wherein the output value (Output) exceeded the first voltage value V1 in the relatively initial time during the secondary galvanization time D2, and the MCU 190 may immediately turn off the switch 181 to block the current flowing through the socket 150.

The MCU 190 may have the second standby time t3 again after the secondary galvanization time D2, and repeat on and off of the switch 181 again. The MCU 190 may proceed with galvanization again during the third galvanization time D3 after the first standby time C. Referring to FIG. 7, the galvanizing device 180 may detect the point d wherein the output value (Output) is smaller than or equal to, or smaller than the second voltage value V2 during the third galvanization time D3, and the MCU 190 may identify this detection, and immediately turn off the switch 181 to block the current flowing through the socket 150.

The MCU 190 may set the lengths of the first standby time C, the second standby time t3, and the galvanization time D differently after the secondary galvanization time D2, and may stop galvanization if the galvanization times of the predetermined number of times are exceeded, and temporarily stop power supply to the socket 150. Also, if the plurality of galvanization times D are repeated for the predetermined number of times or more, the MCU 190 may transmit this information to the processor 270, and the processor 270 may inform the user of abnormal coupling.

In case a current applied to the socket 150 exceeds the predetermined safety range due to an artificial cause, e.g., a cause such as the malfunction of the first sensor 160 or the second sensor 170, or insertion of an inappropriate object, etc., the processor 270 or the MCU 190 may turn off the switch 181 for preventing an electric shock or a safety accident and perform a safety operation, and if such a phenomenon occurs consistently in the plurality of galvanization stages, an additional safety operation may also continue.

Figure 8:
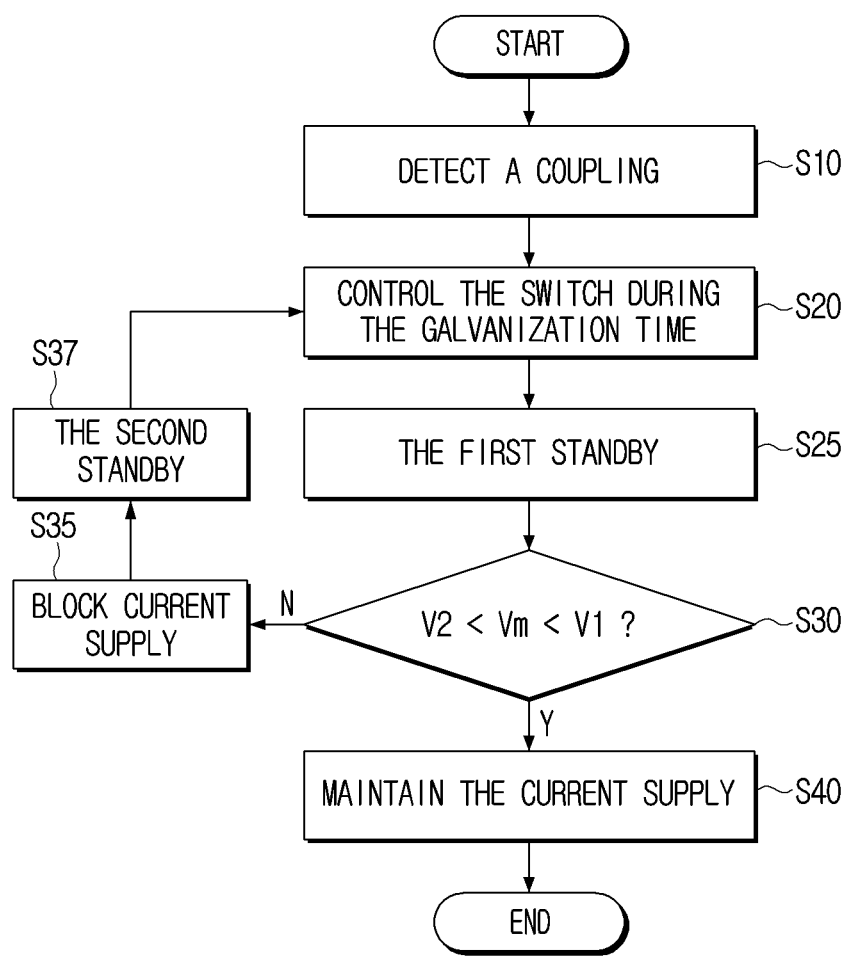
FIG. 8 is a flow chart illustrating a control method of an electronic device according to an embodiment of the disclosure.

FIG. 8 is a flow chart illustrating a control method of the electronic device 100 according to an embodiment of the disclosure.

Referring to FIG. 8, a control method of the electronic device 100 according to the disclosure may include operation S10 of detecting whether an object is inserted into the socket 150, operation S20 of controlling supply of a current to the socket 150 during a preset galvanization time, operation S30 of identifying the value of the current flowing through the socket 150 during the galvanization time, and operation S40 of maintaining the supply of the current to the socket by controlling the switch 181 based on the current value.

In the operation S20 of controlling the switch 181 during the galvanization time, a cycle wherein the switch 181 is turned on during a preset first time and the switch 181 is turned off during a preset second time may be repeated a plurality of times, and in this case, in the operation S30 of identifying the value of the current flowing through the socket 150 during the galvanization time, the current value measured after an initial cycle of a preset number of times among the plurality of cycles may be identified.

The operation S30 of identifying the value of the current flowing through the socket 150 during the galvanization time may According to embodiments include the operation S25 of waiting during a first standby time which is an initial time during the galvanization time, and in this case, the operation S30 of identifying the current value measured after the waiting during the first standby time may proceed.

The operation S30 of identifying the value of the current flowing through the socket 150 during the galvanization time may proceed to the operation of, based on the current value being a value between a first current value which is a preset positive value and a second current value which is a preset negative value, maintaining the supply of the current to the socket 150. Then, the operation S35 of, based on the current value being greater than or equal to the first current value or smaller than or equal to the second current value, controlling the switch 181 to block the supply of the current to the socket 150 may proceed.

In this case, determination of the aforementioned current value may be calculated through a voltage value Vm of the galvanizing device 180, and According to embodiments, the current value may be determined based on whether the voltage value Vm is a value between the first voltage value V1 which is a preset positive value and the second voltage value V2 which is a preset negative value. The voltage value Vm may be the aforementioned output value (Output) amplified through the amplifier 184, or it may be a voltage value of the galvanizing resistance 183.

The operation S35 of blocking the supply of the current may include the operation S37 of, after turning off the switch 181, waiting during a second standby time, and afterwards, the control method may return to the operation S20 of controlling the switch 181 during the galvanization time, and a galvanizing operation may be performed again.

When the control method enters the operation S40 of maintaining the supply of the current to the socket 150 based on the value of the current flowing through the socket 150 during the galvanization time, power may be supplied to the light source 40 coupled to the electronic device 100.

Thus, in the electronic device 100 and the control method thereof according to the disclosure, if an appropriate light source 40 is not fastened to the socket 150, power may be blocked to the socket 150, and power may be supplied to the socket 150 limited to a case wherein an appropriate light source 40 is fastened to the socket 150. Through this embodiment, the electronic device 100 according to the disclosure can include a multimedia function, and can acquire the safety specification as a multimedia device even if it is manufactured or sold while a light source 40 is separated.

Also, in the electronic device 100, in case an inappropriate light source 40 is coupled to the socket 150 or an external object or a user's body is inserted, power may be blocked to the socket 150 by the aforementioned control by the first sensor 160, the second sensor 170, the galvanizing device 180, and the MCU 190, and thus a risk of an electric shock can be prevented, and power is supplied to the socket 150 only when the coupling part 50 of the light source 40 is further coupled to the socket 150 completely, and thus a risk of an electric shock that can occur while a light bulb is being coupled to the socket 150 can be prevented.

While embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:
1. An electronic device comprising:
    a socket;
    a sensor configured to detect whether an object is inserted into the socket;

a switch configured to control a supply of a current to the socket;
a galvanizing device configured to detect the current flowing through the socket; and
a processor that controls the switch based on detection of at least one of results of the sensor and the galvanizing device,
wherein the processor is configured to:
based on detecting insertion of the object into the socket, control the switch during a preset galvanization time, and
control the switch such that the supply of the current to the socket is maintained based on a value of the current flowing through the socket during the preset galvanization time.

2. The electronic device of claim 1,
wherein the processor is further configured to:
control the switch such that the supply of the current to the socket is maintained based on the value of the current measured after a first standby time during the preset galvanization time.

3. The electronic device of claim 1,
wherein the processor is further configured to:
repeat a cycle wherein the switch is turned on during a preset first time and the switch is turned off during a preset second time during the preset galvanization time a plurality of times.

4. The electronic device of claim 3,
wherein the processor is further configured to:
maintain a turned-on state of the switch based on the value of the current measured after an initial cycle of a preset number of times among a plurality of cycles.

5. The electronic device of claim 1,
wherein the processor is further configured to:
based on the value of the current being a value between a first current value which is a preset positive value and a second current value which is a preset negative value, control the switch such that the supply of the current to the socket is maintained.

6. The electronic device of claim 5,
wherein the processor is further configured to:
based on the value of the current being greater than or equal to the first current value or smaller than or equal to the second current value, control the switch such that the supply of the current to the socket is blocked.

7. The electronic device of claim 1,
wherein the sensor comprises:
a light emitting part that irradiates a light inside the socket;
a light receiving part that is spaced from the light emitting part and recognizes the light; and
a transmitting part that detects a recognition state of the light by the light receiving part and transmits the recognition state to the processor.

8. The electronic device of claim 1,
wherein the sensor comprises:
a button that protrudes inside the socket, and configured to be pushed and moved when the object is inserted;
a spring that provides an elastic force while supporting the button; and
an electrode that contacts and is separated from the button based on a movement of the button, and configured to supply or block the current to or from the socket.

9. The electronic device of claim 1,
wherein the galvanizing device comprises:
a galvanizing resistance that is arranged in a route wherein the current flowing through the socket moves;
an amplifier that amplifies a voltage; and
a comparator that receives the voltage and compares the voltage with a preset voltage value, and provides the voltage to the processor.

10. A control method of an electronic device, the method comprising:
detecting whether an object is inserted into a socket;
controlling a switch that controls supply of a current to the socket during a preset galvanization time;
identifying a value of the current flowing through the socket during the preset galvanization time; and
maintaining the supply of the current to the socket by controlling the switch based on the value of the current.

11. The control method of an electronic device of claim 10,
wherein the identifying the value of the current flowing through the socket during the preset galvanization time comprises:
waiting during a first standby time during the preset galvanization time; and
identifying the value of the current measured after the waiting during the first standby time.

12. The control method of an electronic device of claim 10,
wherein the controlling the switch during the preset galvanization time comprises:
repeating a cycle wherein the switch is turned on during a preset first time and the switch is turned off during a preset second time a plurality of times.

13. The control method of an electronic device of claim 12,
wherein the identifying the value of the current flowing through the socket during the preset galvanization time comprises:
identifying the value of the current measured after an initial cycle of a preset number of times among a plurality of cycles.

14. The control method of an electronic device of claim 10,
wherein the identifying the value of the current flowing through the socket during the preset galvanization time comprises:
based on the value of the current being a value between a first current value which is a preset positive value and a second current value which is a preset negative value, proceeding to the maintaining of the supply of the current to the socket.

15. The control method of an electronic device of claim 14,
wherein the identifying the value of the current flowing through the socket during the preset galvanization time further comprises:
based on the value of the current being greater than or equal to the first current value or smaller than or equal to the second current value, controlling the switch to block the supply of the current to the socket.

* * * * *